(12) United States Patent
Cregan et al.

(10) Patent No.: US 10,489,965 B1
(45) Date of Patent: Nov. 26, 2019

(54) SYSTEMS AND METHODS FOR POSITIONING A VIRTUAL CAMERA

(71) Applicant: MappedIn Inc., Kitchener (CA)

(72) Inventors: Zachary Sean Cregan, Kitchener (CA); Bide Yan, Waterloo (CA); Paul Bernhardt, Kitchener (CA); Patrick Paskaris, Kitchener (CA)

(73) Assignee: MAPPEDIN INC., Waterloo (CA)

( * ) Notice: Subject to any disclaimer, the term of this patent is extended or adjusted under 35 U.S.C. 154(b) by 68 days.

(21) Appl. No.: 15/933,694

(22) Filed: Mar. 23, 2018

Related U.S. Application Data

(60) Provisional application No. 62/509,994, filed on May 23, 2017, provisional application No. 62/475,952, filed on Mar. 24, 2017.

(51) Int. Cl.
  *G06T 15/20* (2011.01)
  *G06T 19/00* (2011.01)
  *H04W 4/024* (2018.01)

(52) U.S. Cl.
  CPC ............ *G06T 15/20* (2013.01); *G06T 19/003* (2013.01); *G06T 2200/24* (2013.01); *H04W 4/024* (2018.02)

(58) Field of Classification Search
  CPC ....... G06T 15/20; G06T 19/003; H04W 4/024
  USPC ........................................................ 345/419
  See application file for complete search history.

(56) References Cited

U.S. PATENT DOCUMENTS

| | | | |
|---|---|---|---|
| 7,353,114 B1 * | 4/2008 | Rohlf .................. | G06F 17/2247 702/5 |
| 2013/0162534 A1 * | 6/2013 | Chen .................... | G09B 29/106 345/158 |
| 2013/0321398 A1 * | 12/2013 | Howard ................. | G06T 19/00 345/419 |
| 2013/0321400 A1 | 12/2013 | van Os et al. | |
| 2013/0321401 A1 | 12/2013 | Piemonte et al. | |

(Continued)

FOREIGN PATENT DOCUMENTS

JP    WO 2018/159168    * 1/2018

OTHER PUBLICATIONS

Ritter, "An efficient bounding sphere", Graphics gems, 1990, pp. 301-303, Academic Press Professional, Inc., San Diego, USA.

*Primary Examiner* — Jin Ge
(74) *Attorney, Agent, or Firm* — Own Innovation; James W. Hinton

(57) ABSTRACT

Systems and methods for positioning and orienting a virtual camera relative to an electronic map are disclosed. The system includes a communication network, a wayfinding server, and one or more user devices. The wayfinding server includes a wayfinding storage unit for storing electronic maps. The wayfinding processor is configured for providing an electronic map to the user devices. Each user device includes a user processor operatively coupled to a user memory and is configured for: receiving the electronic map; determining a set of target objects within the electronic map; determining a desired orientation of the virtual camera; generating a point cloud collection; generating a rotation matrix; generating an oriented point cloud; generating a three-dimensional bounding shape; calculating a desired position and orientation for the virtual camera; and providing the electronic map having a view from the virtual camera at the desired position and orientation for display.

18 Claims, 13 Drawing Sheets

(56) References Cited

U.S. PATENT DOCUMENTS

| | | | | |
|---|---|---|---|---|
| 2013/0321403 | A1* | 12/2013 | Piemonte | G06T 15/00 345/419 |
| 2014/0126769 | A1* | 5/2014 | Reitmayr | G06T 7/73 382/103 |
| 2014/0300645 | A1* | 10/2014 | Gillard | G06T 3/40 345/660 |
| 2016/0335796 | A1* | 11/2016 | Roimela | G06T 17/05 |
| 2017/0091993 | A1* | 3/2017 | Andrew | G06F 3/04812 |
| 2017/0356755 | A1* | 12/2017 | Strawn | G01C 21/3635 |

* cited by examiner

SYSTEMS AND METHODS FOR POSITIONING A VIRTUAL CAMERA

RELATED APPLICATIONS

This application claims the benefit of U.S. Provisional Patent Application Ser. No. 62/475,952, filed Mar. 24, 2017 entitled, "SYSTEMS AND METHODS FOR POSITIONING A VIRTUAL CAMERA", and U.S. Provisional Patent Application Ser. No. 62/509,994, filed May 23, 2017 entitled, "SYSTEMS AND METHODS FOR POSITIONING A VIRTUAL CAMERA", the entire contents of which are hereby incorporated by reference herein for all purposes.

TECHNICAL FIELD

The embodiments disclosed herein relates to indoor maps, and, in particular to systems and methods for facility wayfinding and for positioning and orienting a virtual camera relative to the maps and portions thereof.

INTRODUCTION

Recent advancements in technology have transformed the ways in which people orient themselves and navigate from place to place, i.e., wayfinding. For instance, technologies such as global positioning system (GPS)-enabled devices and map applications have made outdoor wayfinding more convenient and accurate.

However, fewer advancements have been made in technology relating to wayfinding within a facility, i.e., facility wayfinding, where GPS typically is not viable for wayfinding. As a result, usually static physical signs and directories are used for wayfinding within facilities. Such signs and directories are expensive to update and may provide limited wayfinding information.

SUMMARY

Digital mapping may provide some advantages over static paper maps. One of these advantages may be the opportunity to consume a three-dimensional (3D) representation of a map which serves as a more accurate and natural representation of a given real-world space. This invention makes it much easier for to arrange the contents of 3D maps on a display such that it highlights important and useful information.

However, with the introduction of 3D maps, existing techniques for arranging a two-dimensional (2D) map on a display may be less effective and/or intuitive then when used on digital 2D maps. Arranging 3D models on a display may be a relatively complicated process and often times there are a number of smaller 3D objects within the model that may be of relative importance to the user at a given point in time (for example, a specific floor, a specific store, a navigation path, the user's current position). It can be challenging to position these points of interest such that they fill the display in an aesthetically pleasing and useful manner.

For example, some existing methods for manipulating digital maps can involve positioning a virtual camera object in 3D space and applying a 3D rotation. This mechanism can make it difficult to position the contents of the 3D map such that it fills the viewable area of the user display with the desired points of interest. Common methods carried over from 2D mapping technology can involve applying a heading to the camera, translating the map in the latitude and longitude axis's, an arbitrary "zoom" value, and, with the introduction of 3D maps, a tilt value.

According to some aspects of the teaching described herein, a wayfinding system can include a new method for positioning a 3D map relative to a computer display in an intuitive way. The system may first provide a way for defining points of interest on a map, and may include taking the 3D points that make up all of the interesting areas on the map you would like to fit onto the display (i.e. the points forming the target objects). The method can then take these 3D points and arrange them into a single collection referred to as a point cloud collection. As an example, this point cloud collection could contain all of the 3D points that make up a 3D polygon which represents a store in a mall, all the points which make up a navigation path rendered on the map, and a user's current GPS position. With this point cloud collection the system can then create a bounding shape that contains the point cloud collection and describe different states for the virtual camera in which the entire bounding shape will be visible in the camera's field of view so that all of these points can be displayed in the viewable portion of a user display in a visually pleasing way.

The various embodiments described herein generally relate to methods (and associated systems configured to implement the methods) for positioning a virtual camera relative to an electronic map. The method includes determining a set of target objects within the electronic map based on user selections received from a user device and determining a desired orientation of the virtual camera. The set includes at least one target object. Each target object has at least one point. The method further includes generating a point cloud collection containing each point of the set of target objects; generating a rotation matrix by comparing a current orientation of the virtual camera and the desired orientation of the virtual camera; generating an oriented point cloud by applying the rotation matrix to each point of the point cloud collection; generating a three-dimensional bounding shape containing each point of the oriented point cloud; calculating a desired position and orientation for the virtual camera based on a field of view of the virtual camera and the three-dimensional bounding shape; and providing the electronic map to the user device for display. The electronic map has a view from the virtual camera at the desired position and orientation.

In some aspects, the set of target objects can include a destination object identified by the user selections. Determining a set of target objects based on user selections received from a user input device can include determining an origination object; determining at least one path from the origination object to the destination object; and including the at least one path and the origination object as being in the set of target objects.

In some aspects, the origination object can be determined based on global positioning system data generated by the user input device.

In some aspects, the three-dimensional bounding shape can be at least one of a group consisting of a sphere, a cone, a cylinder, a polyhedron, a cube, a prism, and a pyramid.

In some aspects, the desired orientation of the virtual camera can include a desired yaw angle and a desired pitch angle.

In some aspects, the current orientation of the virtual camera can include a current pitch angle; and determining the desired orientation of the virtual camera can include using the current pitch angle as the desired pitch angle.

In some aspects, the desired yaw angle can be determined based on an angle between a first point and a second point of the set.

In some aspects, the first point can be an exit point of an origination object and the second point can be an entry point of a destination object.

In some aspects, the field of view of the virtual camera can include a total width along an x-axis and a total height along a y-axis. The desired position can be an x-coordinate value along the x-axis, a y-coordinate value along the y-axis, and a z-coordinate value along a z-axis. Calculating the desired position for the virtual camera based on the field of view of the virtual camera and the three-dimensional bounding shape can include: determining a gross width, a relative width, a gross height, and a gross width of the oriented point cloud; if the relative width of the oriented point cloud is greater than the relative height of the oriented point cloud, identifying the x-axis as a constraining axis and the y-axis as a non-constraining axis; if the relative width of the oriented point cloud is not greater than the relative height of the oriented point cloud, identifying the y-axis as the constraining axis and the x-axis as the non-constraining axis; and determining the z-coordinate value based on the constraining axis. The gross width can be a greatest distance between any two points of the oriented point cloud along the x-axis. The relative width can be the gross width of the oriented point cloud as a proportion of the total width of the field of view of the virtual camera. The gross height can be a greatest distance between any two points of the oriented point cloud along the y-axis. The relative height can be the gross height of the oriented point cloud as a proportion of the total height of the field of view of the virtual camera.

In some aspects, determining the z-coordinate value includes determining the z-coordinate value when the constraining axis is scaled to substantially occupy the field of view. In some aspects, substantially occupying the field of view comprises occupying at least about 70% of the field of view.

In some aspects, calculating the desired position and orientation for the virtual camera based on the field of view of the virtual camera and the three-dimensional bounding shape further includes determining the x-coordinate value as being a point along the x-axis that is equidistant from the two points of the oriented point cloud defining the gross width.

In some aspects, calculating the desired position and orientation for the virtual camera based on the field of view of the virtual camera and the three-dimensional bounding shape further includes determining the y-coordinate value as being a point along the y-axis that is equidistant from the two points of the oriented point cloud defining the gross height.

In another broad aspect, a system for positioning a virtual camera relative to an electronic map is disclosed. The system includes a communication network, a wayfinding server, and one or more user devices. The wayfinding server includes a wayfinding storage unit for storing electronic maps and a wayfinding processor operatively coupled to the wayfinding storage unit. The wayfinding processor is configured for providing an electronic map to one or more user devices via the communication network. Each of the one or more user devices include a user processor operatively coupled to a user memory. The user processor is configured for receiving the electronic map from the wayfinding server via the communication network and determining a set of target objects within the electronic map based on user selections received by the user device. The set includes at least one target object. Each target object has at least one point. The user processor is further configured for determining a desired orientation of the virtual camera; generating a point cloud collection containing each point of the set of target objects; generating a rotation matrix by comparing a current orientation of the virtual camera and the desired orientation of the virtual camera; generating an oriented point cloud by applying the rotation matrix to each point of the point collection; generating a three-dimensional bounding shape containing each point of the oriented point cloud; calculating a desired position and orientation for the virtual camera based on a field of view of the virtual camera and the three-dimensional bounding shape; and providing the electronic map for display. The electronic map has a view from the virtual camera at the desired position and orientation.

Other aspects and features will become apparent, to those ordinarily skilled in the art, upon review of the following description of some exemplary embodiments.

BRIEF DESCRIPTION OF THE DRAWINGS

The drawings included herewith are for illustrating various examples of articles, methods, and apparatuses of the present specification. In the drawings.

DETAILED DESCRIPTION

Various apparatuses or processes will be described below to provide an example of each claimed embodiment. No embodiment described below limits any claimed embodiment and any claimed embodiment may cover processes or apparatuses that differ from those described below. The claimed embodiments are not limited to apparatuses or processes having all of the features of any one apparatus or process described below or to features common to multiple or all of the apparatuses described below.

One or more systems described herein may be implemented in computer programs executing on programmable computers, each comprising at least one processor, a data storage system (including volatile and non-volatile memory and/or storage elements), at least one input device, and at least one output device. For example, and without limitation, the programmable computer may be a programmable logic unit, a mainframe computer, server, and personal computer, cloud based program or system, laptop, personal data assistance, cellular telephone, smartphone, or tablet device.

Each program is preferably implemented in a high level procedural or object oriented programming and/or scripting language to communicate with a computer system. However, the programs can be implemented in assembly or machine language, if desired. In any case, the language may be a compiled or interpreted language. Each such computer program is preferably stored on a storage media or a device readable by a general or special purpose programmable computer for configuring and operating the computer when the storage media or device is read by the computer to perform the procedures described herein.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described (in the disclosure and/or in the claims) in a sequential order, such processes, methods and algorithms may be configured to work in alternate orders. In other words, any sequence or order of steps that may be described does not necessarily indicate a requirement that the steps be performed in that order. The steps of processes described herein may be performed in any order that is practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article.

Figure 1:
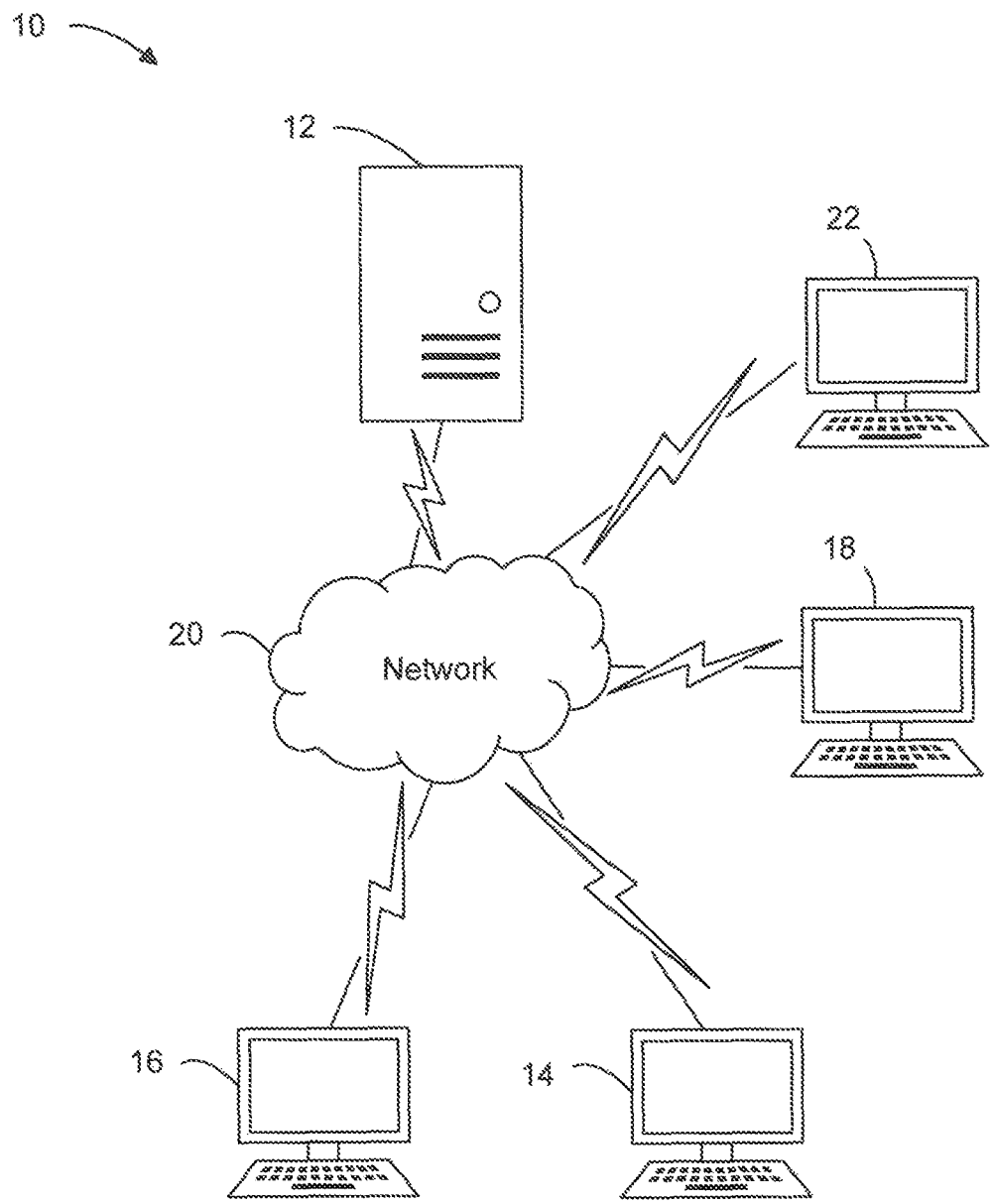
FIG. 1 is a diagram of a wayfinding system, in accordance with an embodiment.

FIG. 1 shows a block diagram illustrating one exemplary embodiment of a wayfinding system 10 for positioning and orienting a virtual camera relative to an electronic map. The wayfinding system 10 is for a facility including multiple objects, i.e., a facility wayfinding system. The wayfinding system 10 is not restricted to a single facility, but may be extended to multiple facilities of the same type and/or different types, each including multiple objects. Examples of objects that may be included in a given facility can include facility units, obstructions, connections, regions, wayfinding nodes and the like. For the purposes of this description, facility units may be configured as stores, rooms and other types of identifiable, generally bounded structures that may form a part of a larger facility.

For example, stores within a shopping center, offices within a commercial office building, classrooms within a school, patient rooms within a hospital, bathrooms inside other structures and the like. Obstructions may be objects that are generally not traversable by the wayfinding system 10 end users and that may tend to impede navigation throughout the facility. Examples of obstructions can include tables, benches, shelfs, beds, other furniture, fountains, sculptures and other objects that are placed within a facility or facility unit but typically do not form part of the structure of the facility or facility unit. Connections may be portions of a facility or facility unit that extend between, and connect, two or more traversable areas within the wayfinding system 10. Examples of connections may include hallways, walkways, staircases, elevators, escalators, ramps, moving walkways and the like. Regions may be regions of the facility and/or a facility unit that are generally open, at least partially traversable areas that are not bounded by walls. Examples of regions can include, atriums, foyers, event spaces, stages, open floor area in a store, concourses, public squares, courtyards and the like. Wayfinding nodes may be objects positioned within a map that are used to help define locations and/or paths for wayfinding purposes, but that do not necessarily correspond to real-world objects. Nodes need not be visible to a system user, but may be displayed in some systems (for example as part of a wayfinding path that is displayed to the user).

Objects in the wayfinding system 10 may be defined and stored in any suitable data and/or file format. Optionally, the objects may be defined as closed polygons, and may be 3D polygons if intended to be used in combination with a facility map or display that can provide 3D images. In some examples, each object may be defined by one or more vertices or points, which when connected together, define the outer boundary of the object. For example, a 3D cube object would include eight points (i.e. the eight corner vertices of a cube) that would be recognized and stored by the wayfinding system 10. As another example, a wayfinding node could include one or more closely spaced points, a facility unit may include a plurality of points arranged in any suitable configuration to bound the intended facility unit perimeter. Obstructions, connections and other object types can also be defined as a plurality of related points. In this description, the plurality of points defining a given object can be referred to as an object point cloud. Because some types of objects can be nested within other objects (such as a shelf object being positioned within a store object, which itself is positioned within a facility object), the object point clouds associated with such objects may also be nested and/or group together. That is, the object point cloud for a store unit may contain the object point clouds of a plurality of fixtures, wayfinding nodes and the like.

The wayfinding system 10 allows users, e.g., visitors to the facility, to orient themselves and to navigate from place to place within the facility, enabling them to find what they are looking for and to discover things around them. For example, a shopper at a mall can use the wayfinding system 10 to search for a particular store or a particular item or class of items (e.g., shoes), navigate to the relevant location, and/or look at the current promotions.

The facility may be any type of facility, and may include a single building or two or more separate buildings, each of which may include any suitable facility units and other objects. Typically, the facility is a commercial facility or an institutional facility. For example, the facility may be a retail facility, e.g., a mall or a shopping center, an office facility, e.g., an office building, an event facility, e.g., a conference center, an amusement park, or a theme park, a transportation facility, e.g., an airport, or a bus terminal, an educational facility, e.g., a school or a university campus, or a medical facility, e.g., a hospital. The facility may be an indoor or an outdoor facility and/or may include a combination of indoor and outdoor portions. However, the wayfinding systems described herein may be particularly useful for indoor facilities and/or facilities with at least some indoor portions.

The facility units may be any type of facility units, and the facility may include different types of facility units. Typically, the facility units are commonly managed as part of the facility. For example the facility units may be stores, restaurants, booths, offices, rooms, halls, washrooms, airport gates, and/or locations or areas within the facility.

The wayfinding system 10 may include a facility wayfinding system, such as those described in United States Patent Application Publication Number 2014/0156186, application Ser. No. 13/852,304, which is hereby incorporated by reference in its entirety.

In the illustrated example, the wayfinding system 10 includes a server platform 12 which communicates with a plurality of store devices 14, a plurality of facility devices 16, and a plurality of administrator devices 18 via a communication network 20. The server platform 12 also communicates with a plurality of visitor devices 22. The server platform 12 may be a purpose built machine designed specifically for implementing a system and method for positioning and orienting a virtual camera relative to an electronic map.

The server platform 12, store devices 14, facility devices 16, administrator devices 18 and visitor devices 22 may be a server computer, desktop computer, notebook computer, tablet, PDA, smartphone, or another computing device. The devices 12, 14, 16, 18, and 22 may include a connection with the communication network 20 such as a wired or wireless connection to the Internet. In some cases, the communication network 20 may include other types of computer or telecommunication networks. The devices 12, 14, 16, 18, and 22 may include one or more of a memory, a secondary storage device, a storage unit, a processor, an input device, a display device, and an output device. Memory may include random access memory (RAM) or similar types of memory. Also, memory may store one or more applications for execution by the processor. Applications may correspond with software modules comprising computer executable instructions to perform processing for the functions described below. Secondary storage devices may include a hard disk drive, floppy disk drive, CD drive, DVD drive, Blu-ray drive, or other types of non-volatile data storage.

The processor of each of devices 12, 14, 16, 18, and 22 may execute applications, computer readable instructions or programs. The applications, computer readable instructions or programs may be stored in memory or in secondary storage, or may be received from the Internet or other communication network 20. Input device may include any device for entering information into device 12, 14, 16, 18, and 22. For example, input device may be a keyboard, key pad, cursor-control device, touch-screen, camera, or microphone. Display device may include any type of device for presenting visual information. For example, display device may be a computer monitor, a flat-screen display, a projector or a display panel. Output device may include any type of device for presenting a hard copy of information, such as a printer for example. Output device may also include other types of output devices such as speakers, for example. In some cases, device 12, 14, 16, 18, and 22 may include multiple of any one or more of processors, applications, software modules, second storage devices, network connections, input devices, output devices, and display devices.

Although devices 12, 14, 16, 18, and 22 are described with various components, one skilled in the art will appreciate that the devices 12, 14, 16, 18, and 22 may in some cases contain fewer, additional or different components. In addition, although aspects of an implementation of the devices 12, 14, 16, 18, and 22 may be described as being stored in memory, one skilled in the art will appreciate that these aspects can also be stored on or read from other types of computer program products or computer-readable media, such as secondary storage devices, including hard disks, floppy disks, CDs, or DVDs; a carrier wave from the Internet or other communication network; or other forms of RAM or ROM. The computer-readable media may include instructions for controlling the devices 12, 14, 16, 18, and 22 and/or processor to perform a particular method.

In the description that follows, devices such as server platform 12, store devices 14, facility devices 16, administrator devices 18, and visitor devices 22 are described performing certain acts. It will be appreciated that any one or more of these devices may perform an act automatically or in response to an interaction by a user of that device. That is, the user of the device may manipulate one or more input devices (e.g. a touchscreen, a mouse, or a button) causing the device to perform the described act. In many cases, this aspect may not be described below, but it will be understood.

As an example, it is described below that the devices 14, 16, 18, and 22 may send information to and receive information from the server platform 12. For example, a store user using the store device 14 may manipulate one or more input devices (e.g. a mouse and a keyboard) to interact with a user interface displayed on a display of the store device 14 to respond to questions. Generally, the device may receive a user interface from the communication network 20 (e.g. in the form of a webpage). Alternatively or in addition, a user interface may be stored locally at a device (e.g. a cache of a webpage or a mobile application).

Server platform 12 may be configured to receive a plurality of information, from each of the plurality of store devices 14, facility devices 16, administrator devices 18, and visitor devices 22. The store devices 14, facility devices 16, administrator devices 18, and visitor devices 22 are herein referred to as user devices. Generally, the information may comprise at least an identifier identifying the user who may be associated with a store, associated with a facility, an administrator of the system, or a visitor of the store or facility. For example, the information may comprise one or more of a username, e-mail address, password, or social media handle.

In response to receiving information, the server platform 12 may store the information in storage database. The storage may correspond with secondary storage of the device 12, 14, 16, 18, and 22. Generally, the storage database may be any suitable storage device such as a hard disk drive, a solid state drive, a memory card, or a disk (e.g. CD, DVD, or Blu-ray etc.). Also, the storage database may be locally connected with server platform 12. In some cases, storage database may be located remotely from server platform 12 and accessible to server platform 12 across a communication network 20 for example. In some cases, storage database may comprise one or more storage devices located at a networked cloud storage provider.

The store device 14 may be associated with a store account. Similarly, the facility device 16 may be associated with a facility account, the administrator device 18 may be associated with an administrator account, and the visitor device 22 may be associated with a visitor account. Any suitable mechanism for associating a device with an account is expressly contemplated. In some cases, a device may be associated with an account by sending credentials (e.g. a cookie, login, or password etc.) to the server platform 12. The server platform 12 may verify the credentials (e.g. determine that the received password matches a password associated with the account). If a device is associated with an account, the server platform 12 may consider further acts by that device to be associated with that account.

The devices 14, 16, 18, and 22 and the server platform 12 may communicate asynchronously, for example, by using an implementation of the WebSocket protocol, such as Socket.IO. Updates may be sent from the server platform 12 to each of the devices 14, 16, 18, and 22 in real time as interrupts, i.e., without polling. Likewise, user interaction data may be sent from each of the devices 14, 16, 18, and 22 to the server platform 12 in real time as interrupts, i.e., without polling.

Figure 2:
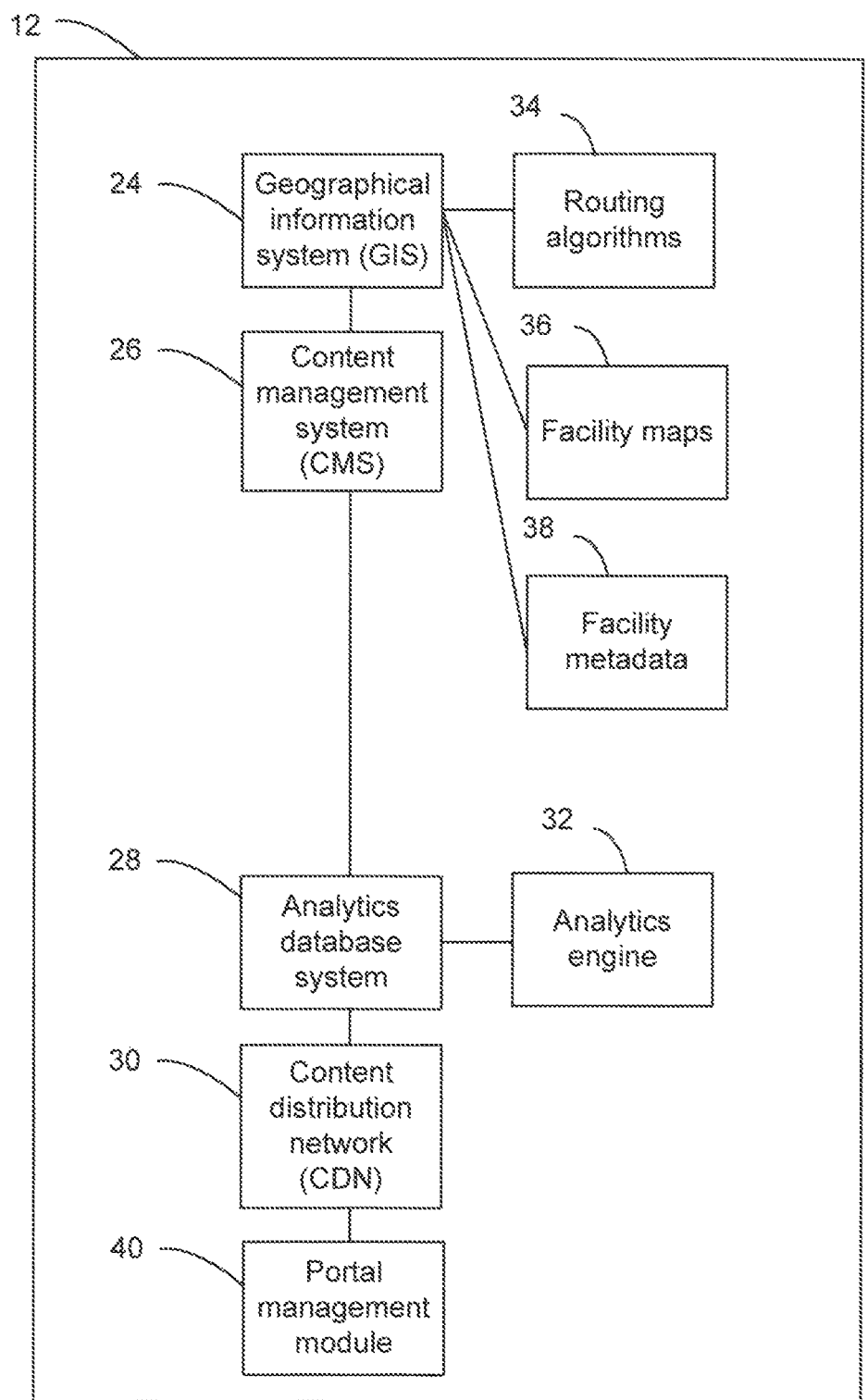
FIG. 2 is block diagram of a server platform of the wayfinding system of FIG. 1.

Turning now to FIG. 2, illustrated therein is the server platform 12, in accordance with an embodiment. The server platform 12 includes a content management system (CMS) 26, an analytics database system 28, and a geographical information system (GIS) 24. The server platform 12 may include multiple backend devices, e.g., servers. The server platform 12 may include at least a database server and a hosting server. In some instances, the server platform 12 also includes a content distribution network (CDN) 28. The CMS 26 and the analytics database system 30 may be hosted by the server platform 12. The GIS 24 may be hosted internally by the server platform 12 or supplied externally.

In some embodiments, the CMS 26 may be a frontend interface application, typically, implemented as a web service. CMS 26 may communicate with GIS 24, which then modifies the database. In this case, GIS 24 may be an Application Program Interface (API) which manipulates the database.

In some embodiments, CMS 26 stores content, including information relating to the facility and the facility units, handles updates to the content received from the devices 14, 16, 18, and 22, and provides content to the devices 14, 16, 18, and 22. For example, the CMS 26 may be a no structured query language (NoSQL) database application. The content stored in the CMS 26 is customizable for the type of facility. Typically, the information stored for each facility unit includes a profile, a link to a webpage and/or link to a social media page, a photograph, directory information, e.g., a phone number and/or an address, opening hours, event information, promotional information, e.g., an advertisement and/or a marketing message, and/or a promotional item, e.g., a digital coupon. Often, the information relating to the facility and the facility units is tied to a related entry in the facility metadata 38 stored in the GIS 24. This allows larger, less frequently accessed files to be stored in the CMS 26, rather than the GIS 24.

In some embodiments, the analytics database system 28 includes or is operatively connected to an analytics engine 32. The analytics database system 28 may be a database application, typically implemented as a web service. The analytics database system 28 stores all user interactions, e.g., user selections or "hits", searches, dates, types of mobile device, and/or movement patterns represented as heat maps, in real time, and generates analytics relating to the user interactions. Advantageously, because user interactions are recorded for several different the devices 14, 16, 18, and 22, a relatively large sample size is obtained. The large sample size may allow analytics engine 32 to plot heat maps that are useful for users and to provide suggestions to improve user experience.

The GIS 24 is, typically, a representational state transfer (REST)-ful application programming interface (API). The GIS 24 includes routing algorithms 34, electronic facility maps 36, and associated facility metadata 38. The GIS 24 may store the electronic facility maps 36 and the facility metadata 38, handle updates to the electronic facility maps 36 and the facility metadata 38, and provide the electronic facility maps 36 and the facility metadata 38 to the devices 14, 16, 18, and 22. Typically, the GIS 24 serves the electronic facility maps 36, e.g., as PNG files, and the facility metadata 38, e.g., as JSON/XML files, over the web. The facility metadata 38 is customizable for the type of facility, and may include digital representations of paths, polygons encapsulating facility units, nodes corresponding to facility locations, identifiers for each facility unit, and qualitative metadata, such as the type of path, e.g., hallway or dirt trail. Optionally, information about the objects utilized for a given system (i.e. all of the objects that are used to define a given facility, etc.) can be stored in the server platform in an object library that can be a separate module on the server platform 12, or may be incorporated within the electronic facility maps 36 module, facility metadata module 38 or any other suitable location. The object point cloud data is an attribute for each object that can be stored in the object library.

The GIS 24 also uses the routing algorithms 34 to calculate routes and provides the routes to the devices 14, 16, 18, and 22. Typically, the routing calculations output a JSON/XML list of node or polygon identifiers representing a complete path, which the devices 14, 16, 18, and 22 will interpret and display. The output may also include points of interest and other metadata 38, such as total estimated travel time based on type of path and real-time traffic, as described herein.

The visitor devices 22 may be efficiently managed and run both online and offline. The visitor devices 22 may create a simple navigation tool that engages visitors as they seek out more information about the venue. Each interface may be carefully designed with a focus on the user experience. Designs can be adapted to each venue's brand and specific needs, providing a unique interface with no disruption to the user experience. The visitor devices 22 may be configured to provide a smooth, intelligent personal indoor mapping experience. Visitors can access directions and venue information from anywhere in the venue. Alternatively or additionally, visitors can plan routes prior to arriving and contact a location by phone or via social media directly from their personalized profile.

The server platform 12 may include a portal management module 40 for managing the system 10. The store device 14, the facility device 16, and the administrator device 18 communicate with the portal management module 40 to create and modify facility related data.

With portal management module 40, all building data may optionally be generated or modified using one tool via a web browser. The portal management module 40 may include collaborative tools with secure user accounts and permissions. In some embodiments, each user may be assigned a role with appropriate security credentials, such as an administrator (administrator device 18), a facility manager (facility device 16), and a store manager (store device 14). The administrator device 18 may have higher security clearance in terms of accessing and updating data, and modifying settings. The facility device 16 can change venue and store description, logos and so on, but may not have permission to alter maps. The store device 14 can modify or alter data relating to their own store. Additional rules may be enforced if desired. For example, user "A" may only access and/or change certain data pertaining to certain stores, and so on.

For example, a venue editor may log into portal 40 make edits to an electronic map 36 and save the electronic map 36 at different stages. The unfinished electronic map 36 may be saved in draft mode, where the editor may not have permission to publish the updated map until approved by administrator or facility owner, and the system may be configured to track approvals.

Optionally, the maps 36 created using the wayfinding system 10 may be displayed to the user, for example via a display screen on a suitable visitor device 22 (for example a smartphone and/or tablet) in a two-dimensional (2D) representation (i.e. in a top or plan view) or optionally in a three-dimensional (3D) representation (i.e. a simulated perspective view). In some embodiments, the wayfinding system 10 may be operable to display a map 36 in both 2D and 3D, and optionally may be operable to change between 2D and 3D representation modes. Optionally, the wayfinding system 10 may include tools for users and/or system administrators to modify and edit the maps. In some embodiments, these map editing tools may be configured to use 2D maps because it may help simplify the editing process.

If a map 36 is a 3D map, it may be helpful in some instances to change the vantage point from which the map 36 is viewed. This may be achieved by positioning and orienting a virtual camera relative to the map 36 and providing the view point form the camera on a suitable display to be observed by a user. For example, a 3D map may be viewed from an angle to provide a 3D looking, isometric type representation of the map 36, or alternatively may be viewed from an overhead position to provide a generally top-down view of the 3D map (which may visually resemble a 2D map in some aspects). Optionally, the changes between the map vantage points may be selected manually, for example by a system user, may be automatically determined by the wayfinding system 10 based on any suitable criteria, and/or the wayfinding system 10 may be configured to allow both types of re-configuration (i.e. the system 10 may automatically present a given vantage point but may allow a system user to override the default view selection). The criteria used for the wayfinding system 10 to automatically determine if a particular map 36 or map segment ought to be rendered in a 2D representation or a 3D representation may include one or more of a variety of suitable factors, including the scale of the map (larger scale view may be presented in a top down view, whereas local views may be presented in 3D view), type of representation (a store layout may be presented from and angled perspective by default, whereas a map showing an entire floor of a mall may first be presented in in a top down view), nature of objects to be presented, arrangement of objects in the map (a top down view may be suitable if some objects of interest may be visually obscured by other objects if represented from an angled perspective).

In the illustrated example, the 3D rendering can be displayed to the user from the perspective of a virtual camera that is positioned and oriented within the virtual world or map coordinate space. In some embodiments, the position of the virtual camera can be expressed using Cartesian coordinates (e.g., x, y, z). In some embodiments, the orientation of the virtual camera can be expressed using body frame coordinates (e.g., yaw, pitch, and roll), Euler angles, quaternions, matrices, or any other appropriate representation for three-dimensional space. The virtual camera can be moved throughout the map coordinate space to provide virtual view points from a variety of different positions/perspectives. If a system user wishes to modify the 3D display they are viewing, for example to rotate the view to observe the map from a different virtual perspective, the virtual camera can be moved within the map coordinate space so that it is positioned in a suitable location to provide the desired view/perspective on the 3D map. This may appear to a system user as if the 3D map is moving relative to their view point and/or that they are moving through the virtual 3D map environment.

In some embodiments, it may be useful to be able to display portions of a map from different viewpoints, in different resolutions, in different levels of detail and the like based on a variety of factors, including system default settings and user inputs. For example, it may be helpful to display an overhead plan view of an entire facility, or perhaps a given floor within a facility, to give a system user an overview of the facility layout and the relative location of other objects within the facility. For example, the wayfinding system 10 may display the overall layout of a shopping mall to a user, to illustrate the overall shape of the facility and the position of different stores, obstructions and the like within the facility. In other examples, the wayfinding system 10 may display only some of the available objects to a user. For example, a user may request information about a given store within a shopping mall facility, and the wayfinding system 10 may then adjust the information displayed to the user to focus on the selected store, for example by "zooming in" on the selected store and increasing its size on the user display. In this description, orienting the virtual camera and updating the display to show only the desired/selected objects can be described as framing the selected objects.

Optionally, the wayfinding system 10 can be configured so that when an object, or group of objects are selected to be framed, that it can automatically adjust the virtual camera so that any selected objects are displayed in their entirety within the frame, and that the view displayed to the user is "zoomed in" on the selected objects. Preferably, the wayfinding system 10 can automatically adjust the virtual camera so that it can be close to the selected objects to help provide a clear, detailed and/or emphasized view focused on the selected objects, while still ensuring that the selected objects remain contained within the frame, and are not partially cropped or otherwise extend beyond the borders of the display presented to the user. This may help provide useful information to system users and may help facilitate displaying map and wayfinding information on relatively small display devices (such as smartphones or tablets). This may help facilitate arranging the contents of a 3D map on a given user display device such that it can highlight important and/or useful information to the user. Positioning and orienting the virtual camera to achieve the desired frame display and/or positioning the map (2D or 3D) relative to the user display can be challenging.

For example, some existing methods to create the desired frame display can involve positioning and orienting a virtual camera object in 3D space and applying a 3D rotation. This primitive mechanism may make it difficult to position the contents of the 3D map such that it fills the display with the desired objects of interest. Some methods have been carried over from 2D mapping technology and can involve applying a heading to the camera, translating the map in the latitude and longitude axis's, an arbitrary "zoom" value, and with the introduction of 3D maps a tilt value. This method again makes it difficult to position the contents of the 3D map such that it fills the display with the desired points of interest. While there are existing methods with help with this problem in 2D mapping, there have yet to be methods for solving this in 3D mapping.

Optionally, the wayfinding system 10 may be configured to perform a virtual camera positioning method to automatically configure the virtual camera so that selected object(s) can be emphasized and displayed on a given display device in a visually pleasing manner.

Figure 3:
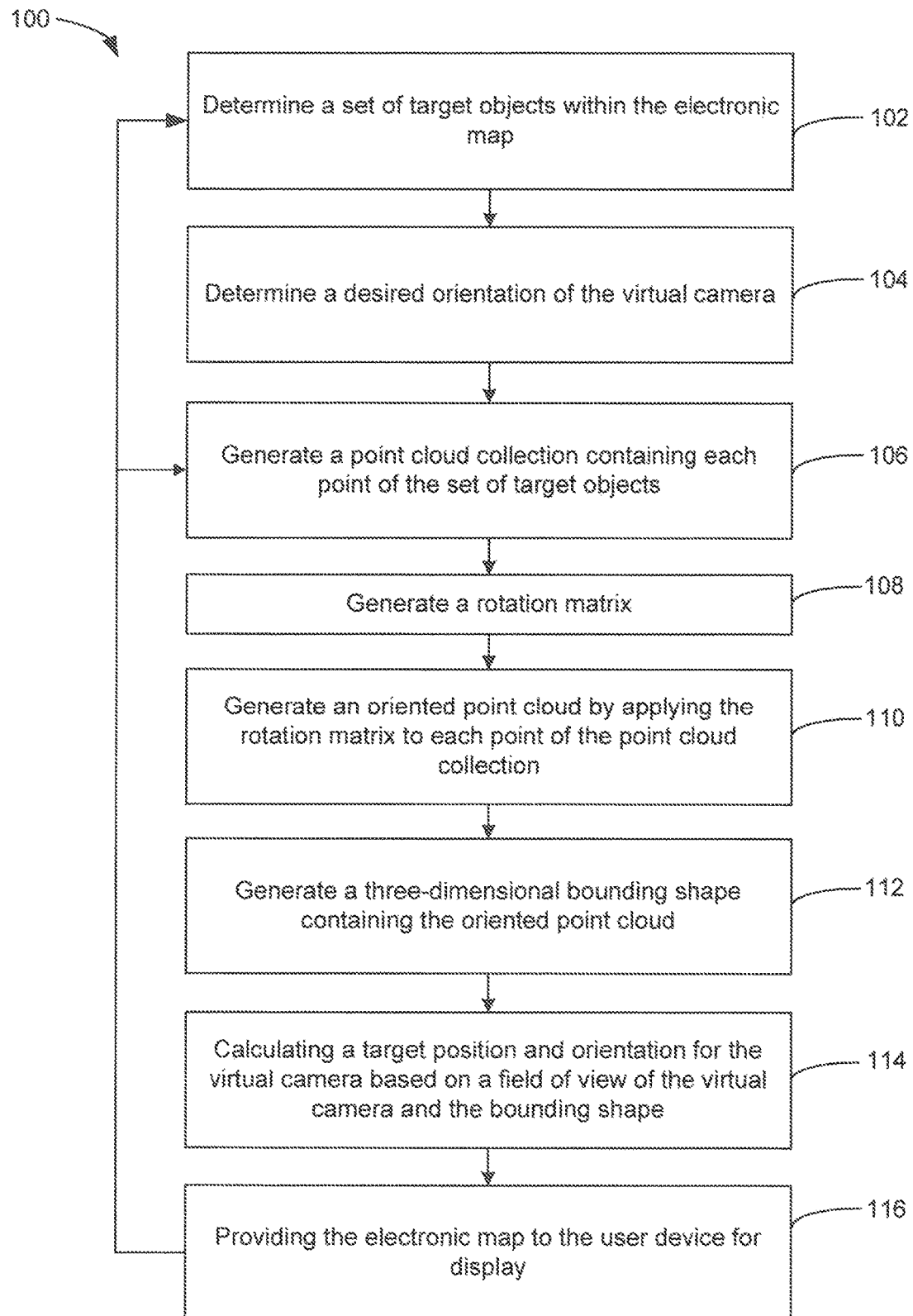
FIG. 3 is a schematic representation of one example of a virtual camera positioning method.

One example of a virtual camera positioning method 100 is illustrated in FIG. 3, and includes the steps of determining the object(s) to be included in the frame display, herein referred to as a set of target objects (step 102), determining the virtual camera orientation desired for the frame (step 104), and combining the object point clouds for each of the target objects to create a point cloud collection (step 106). With a point cloud collection defined, the system 10 can then create a suitable rotation matrix for transforming the current orientation (i.e., current pitch and current yaw) of the virtual camera to the desired orientation (i.e., desired pitch and desired yaw) of the virtual camera for the current frame display (step 108). The desired roll is preferably set to 0 degrees so that the view is intuitive for a user. The rotation matrix can then be applied to each point in the point cloud collection (i.e. iterated through the points of each individual object point cloud), to create a new, oriented point cloud (step 110). The system can then generate a 3D bounding shape that contains all points in the oriented point cloud (step 112), such as a sphere, a cone, a cylinder, a polyhedron or other closed 3D polygons, such as a rectangular prism, a cube, or a pyramid. The system can then calculate a position for the virtual camera within the map coordinate world in which the bounding shape fits within the field of view of the virtual camera (step 114). The virtual camera positioning method 100 can then output new position and orientation values for the virtual camera (step 116), which may include x, y, and z co-ordinate information as well as yaw and pitch values. The system 10 may then generate the frame display on the user display device by positioning and orienting the virtual camera as specified by the virtual camera positioning method 100. Optionally, portions of the method 100 may be iterated based on user inputs and/or system 10 operations (without requiring specific user inputs).

Identifying which objects are to be included in a given frame may (step 102) may be achieved using any suitable inputs. For example, the wayfinding system 10 may display a map 36 to a user, and the user may identify objects of interest on the map 36, for example by tapping on an object via a touchscreen interface or otherwise selecting one or more objects.

Alternatively, or in addition to receiving user selections for every object, the system 10 may automatically identify objects to be included in a frame based on other parameters. For example, the wayfinding system 10 may display a user's current location on a map 36 (which may be a node object) of a facility and a user may identify an object (such as a store) as a desired destination. The wayfinding system 10 may then calculate a path and travel directions from the user's current location and the selected destination. The path may include one or more wayfinding nodes. Step 102 may then include identifying the user's current position node (e.g., origination object) and the store object (e.g., destination object) as target objects to be included in the frame display, and may also automatically select all of the wayfinding nodes that are utilized in the calculated wayfinding path (without requiring a user to individually select each node in the path).

The generation of a point cloud collection in step 106 may then include the object point clouds for the user's current position node (e.g., origination object), the store object (e.g., destination object), and each of the wayfinding nodes. All of these objects will also then be included in the oriented point cloud created at step 110 and will be contained in the 3D bounding shape of step 112. At the end of the method 100, the virtual camera will then be positioned to provide the desired frame display that focuses on the user's current position and the path to the user's intended destination. Optionally, as the user moves along the path the virtual camera positioning method 100 can be iterated, such that the frame displayed to the user is recreated to focus on the user's current position, travel path and final destination (thereby removing objects from the frame display that the user has already passed, etc.).

Figure 4:
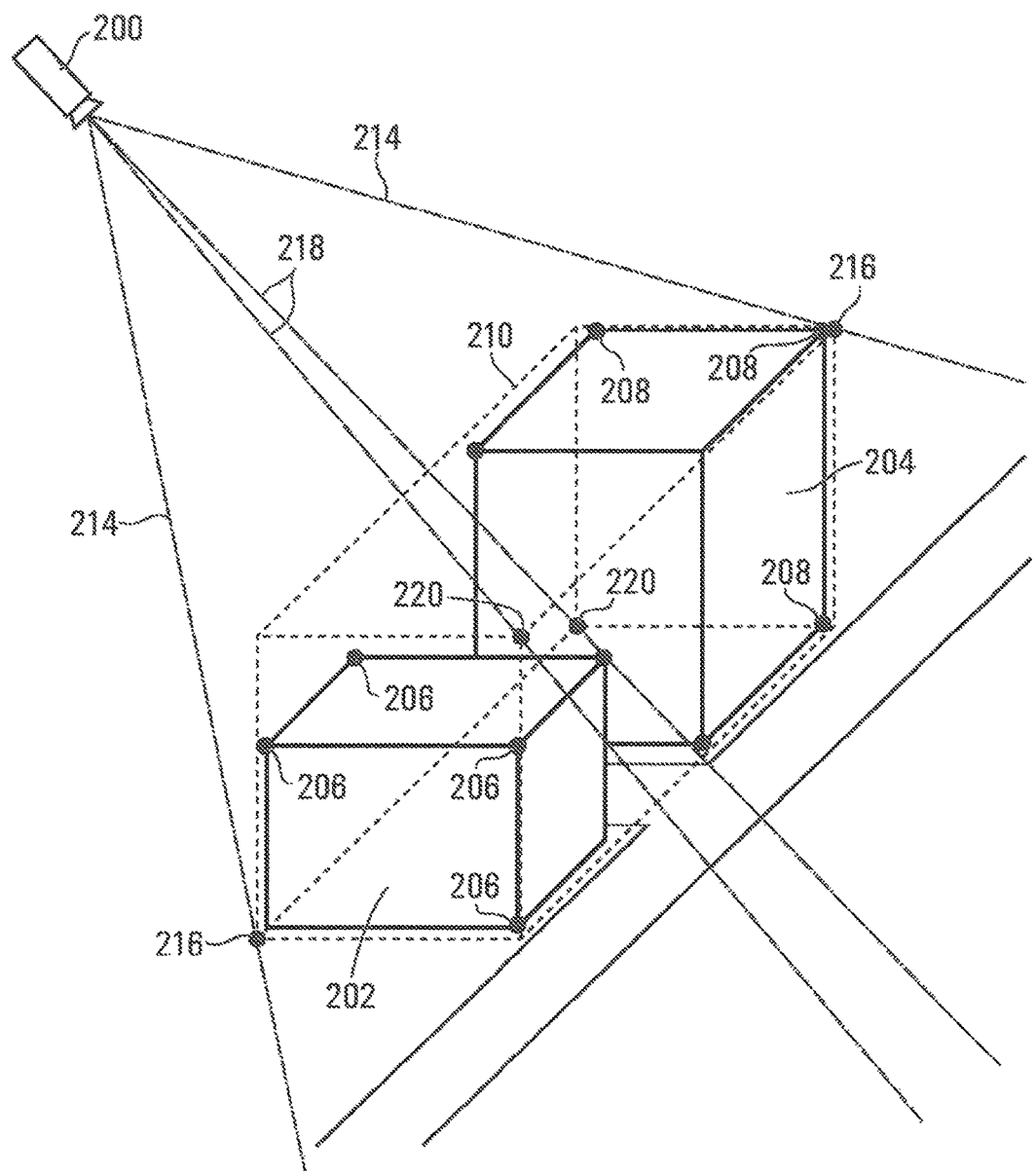
FIG. 4 is a schematic view of one example of a virtual camera positioned relative to a rectangular prism bounding shape.

Referring to FIG. 4, a schematic representation of one embodiment of a virtual camera 200 is illustrated in combination with exemplary target objects 202 and 204. In this example the objects 202 and 204 are represented as simple rectangular prisms, and each include respective vertices 206 and 208 that define the points in the respective object point cloud for each object 202 and 204. If the objects 202 and 204 were selected as the objects to be framed, that is, the target objects (step 102), the combination of the vertices 206 and 208 would define the point cloud collection at step 106. The virtual camera positioning method 100 would then, using the desired virtual camera yaw and pitch (or azimuth and elevation) (step 104) received, construct a suitable 3D rotation matrix (such as a 4×4 rotation matrix—step 108) that would be required to move the virtual camera 200 from its instantaneous location at the initiation of the virtual camera positioning method 100 (e.g., current orientation) to its desired orientation for the frame display (as shown in FIG. 4). The rotation matrix is then applied, at step 110, to all of the points in the point cloud collection, thereby returning an oriented point cloud in the rotated coordinate system, defining new positions for each vertex 206 and 208.

In this example, the virtual camera positioning method 100 then generates a bounding shape 210 in the form of a rectangular prism that contains all of the vertices 206 and 208 in the oriented point cloud. The virtual camera positioning method 100 can then return minimum and maximum values in the x and y axes and a minimum z value (the point closest to the front of the virtual camera 200) for the bounding shape that are required to contain the oriented point cloud. The virtual camera positioning method 100 can then calculate the x and y positions for the virtual camera 200 in the rotated coordinate system. In this example, the desired virtual camera location is calculated as the center point between the x and y axes of the bounding shape 210. Next, the virtual camera positioning method 100 can then calculate the z position for the virtual camera 200. In this example, the method can geometrically calculate two candidate z values.

One z value can be determined by calculating the intersection of the field of view along the x-axis of the virtual camera 200 (see dashed lines 214) with the minimum and maximum bounding shape values in the x axis (i.e. the x value at the points where the lines 214 intersect the corners 216 of the bounding shape 210). The minimum and maximum bounding shape values in the x axis can define a gross width of the bounding shape 210. Using this data, the virtual camera positioning method 100 can calculate a first candidate z value (or distance) that is required for the entire x-axis extent of the bounding shape 210 to fit within the field of view of the virtual camera 200. That is, the candidate z value for which the bounding shape 210, and the set of target objects within it, will fit horizontally on the given user display. A relative width of the bounding shape 210 can be defined as the proportion of the bounding shape 210 with respect to the field of view of the virtual camera 200 along the x-axis. The candidate z value can then be associated with the relative width of the bounding shape 210.

Another candidate z value can be determined in a similar manner, using the using the field of view along the y-axis of the virtual camera 200 (see dashed lines 218) and the minimum and maximum bounding shape 210 values in they axis (i.e. the y values at the points where lines 218 intersect the corners 220 of the bounding shape 210). The minimum and maximum bounding shape values in the y axis can define a gross height of the bounding shape 210. Using this data, the virtual camera positioning method 100 can calculate a second z value (or distance) that is required for the entire y-axis extent of the bounding shape 210 to fit within the field of view of the virtual camera 200. That is, the z value for which the bounding shape 210, and the set of target objects within it, will fit vertically on the given user display. A relative height of the bounding shape 210 can be defined as the proportion of the bounding shape 210 with respect to the field of view of the virtual camera 200 along the y-axis. The candidate z value can then be associated with the relative height of the bounding shape 210.

The virtual camera positioning method 100 can then choose the larger of these two candidate z values as the final z value. This can help ensure that the entire bounding shape 210 will be visible within the frame display and that the bounding shape 210 will substantially fill at least one axis of the frame display, referred to herein as the constraining axis. Preferably, the virtual camera 200 can be positioned so that the set of target objects in the frame occupy at least 70% of the constraining axis, or optionally at least 75%, at least 80%, at least 85%, at least 90%, at least 95%, and at least 97% of the constraining axis.

This may also help center the virtual camera 200 relative to the oriented point cloud in the non-constraining axis, and helps ensure the bounding shape 210 (and the oriented point cloud therein) fits substantially perfectly in the constraining axis. Having completed the z value calculations, the virtual camera positioning method 100 can output a complete set of position and orientation data (x value, y value, z values, pitch and yaw) to arrange the virtual camera 200. This position and orientation data can be multiplied by the inverse of the rotation matrix in order to get the virtual camera position back in the map space coordinate system. The virtual camera positioning method 100 can then apply the rotation values supplied in the step 108 to point the virtual camera 200 in the desired direction.

Figure 5:
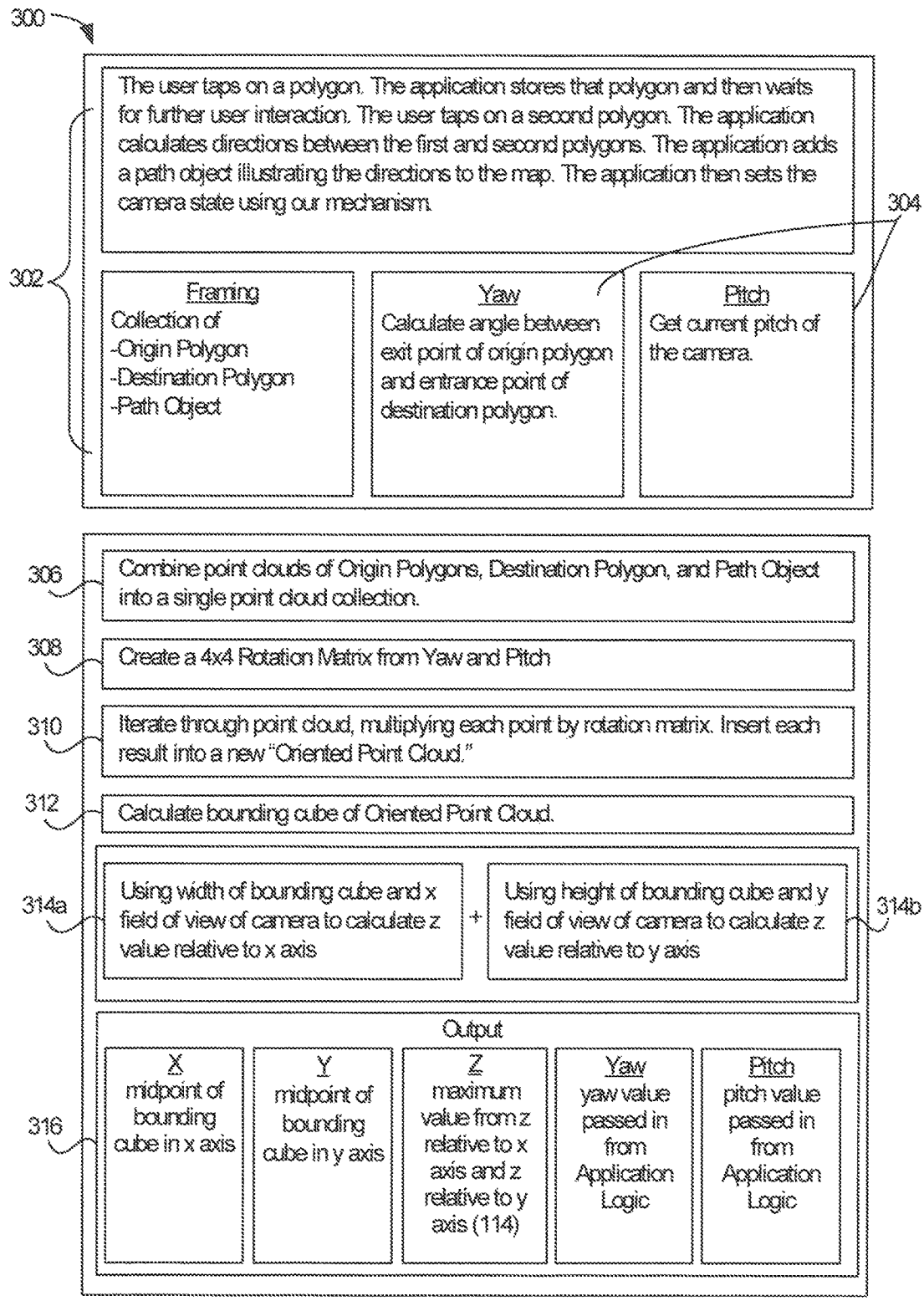
FIG. 5 is a schematic representation of another example of a virtual camera positioning method.

Referring to FIG. 5, an example of the virtual camera positioning method 300 being applied by a wayfinding system 10, and using a cube as the bounding shape 210, is illustrated. In this example, step 302 includes having a system user tap on a polygon (i.e. a store object) that is displayed on a map 36 on a touch-sensitive user display device, the wayfinding system 10 then retrieves information about the selected polygon object from the object library and awaits further input. The user is then prompted to select a second polygon from the map 36. The wayfinding system 10 then calculates a route between the two selected polygons and adds a path object (consisting of a plurality of nodes) onto the map 36. The wayfinding system 10 then engages the rest of the virtual camera positioning method 300 to generate a virtual camera 200 position that can display the selected polygons and path object (target objects) to the user in the desired manner.

In this example, the virtual camera positioning method 300 calculates the desired virtual camera 200 pitch based on the current pitch of the virtual camera 200 when the virtual camera positioning method 300 was initiated, and calculates a desired virtual camera yaw value based on the geometrical relationship, or interaction between the target objects. Specifically, the desired yaw value can be selected by calculating an angle between an exit point defined on the first polygon and an entrance point defined on the second polygon. Selecting the desired yaw value as the angle between the exit point on the first polygon and the entrance point on the second polygon causes the virtual camera to be positioned in a direction from the starting point to the destination. These values can be stored for use in the virtual camera positioning method 300. In other embodiments, the current yaw value of the virtual camera 200 can be used as the desired camera yaw value so that the virtual camera rotation remains unchanged.

Having defined the objects to be displayed (target objects) and the desired virtual camera 200 orientation (desired yaw and pitch values), the virtual camera positioning method 300 advances to step 306 where a point cloud collection is defined, and step 308 in which a suitable 4×4 rotation matrix is generated. At step 310 the rotation matrix is applied to the point cloud collection to create the oriented point cloud, and at step 312 a bounding cube 210 is created around the oriented point cloud. At step 314, the virtual camera positioning method 300 can calculate the x-axis and y-axis extent of the bounding cube, and two possible z values for the virtual camera 200 (step 314a and 314b). The framing system 10 can automatically select the larger of the two z values calculated, and at step 316 output the virtual camera position and orientation data (x, y and z values as calculated in step 312 and 314 and the yaw and pitch values defined in step 304).

Figure 6:
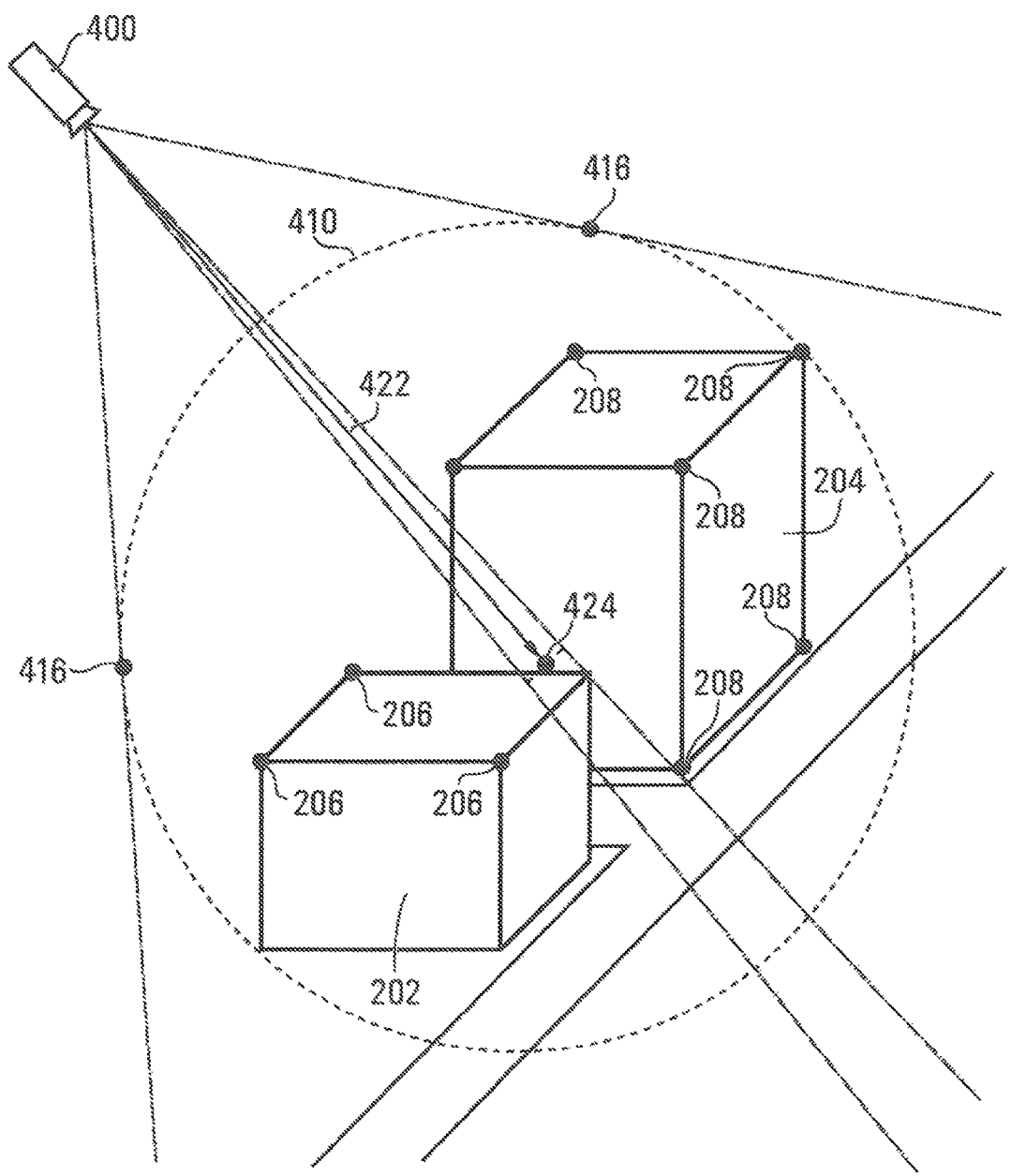
FIG. 6 is a schematic view of one example of a virtual camera positioned relative to a spherical bounding shape.

Referring to FIG. 6, a schematic representation of another embodiment of a virtual camera 400 is illustrated in combination with exemplary objects 202 and 204. This embodiment is generally analogous to the embodiment of FIG. 4 but instead of defining the bounding shape 210 as a rectangular prism, the bounding shape 410 is configured as a bounding sphere. Applying the virtual camera positioning method 100 with a bounding sphere 410 instead of a bounding rectangular prism 210 may make it easier to maintain the same distance 422 between the virtual camera 400 and the center 424 of the oriented point cloud regardless of the desired virtual camera yaw and pitch. This may also mean that the virtual camera 400 does not necessarily perfectly fit the oriented point cloud to the edges of the virtual cameras field of view, and therefore to the edges of the user display. This camera method 100 may be useful when rotating or animating around an oriented point cloud, as the virtual camera 400 does not move closer to or further away from the point cloud as the virtual camera 400 rotates (which differs from applying the method using the bounding rectangular prism). In this example, the virtual camera positioning method 100 can first calculate a bounding sphere for the oriented point cloud using any suitable method or algorithm. One example of a suitable algorithm is Ritter's bounding sphere algorithm (see http://dl.acm.orgicitation.cfm?id=90836).

The virtual camera positioning method 100 can then geometrically calculate the required distance 422 the virtual camera 400 must be from the center 424 of the bounding sphere 410 using the radius of the bounding sphere 410 as well as the minimum field of view of the virtual camera 400. Then, using the desired virtual camera yaw and pitch provided, the virtual camera positioning method 100 can create a direction vector that can be multiplied by the distance 422, and then offset that vector by the bounding sphere center point 424 in order to get the final position and orientation of the virtual camera 400.

Figure 7:
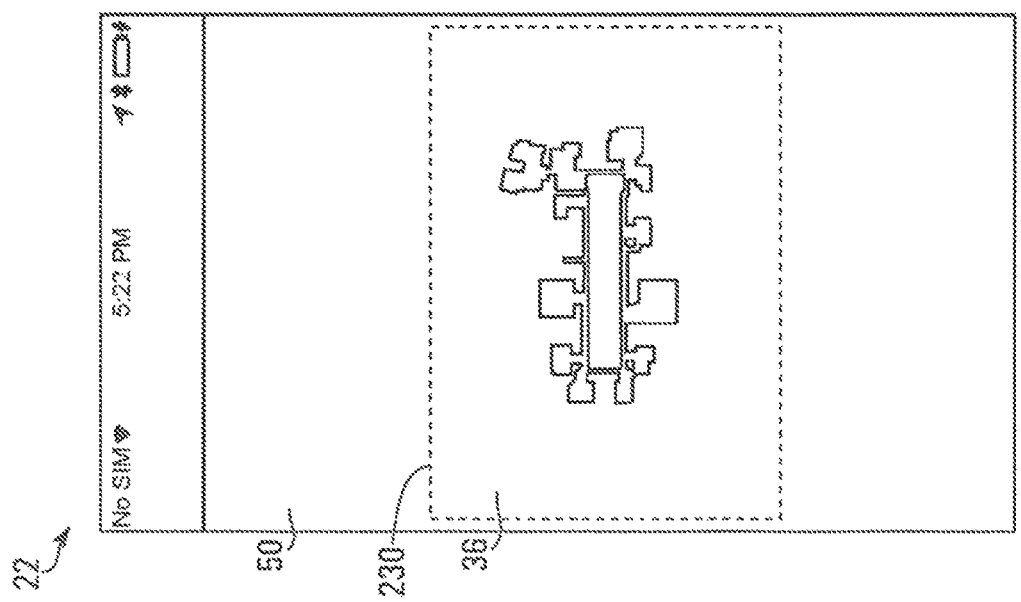
FIG. 7 is a schematic representation of a display of a user device showing one example of a map.

Referring to FIG. 7, one example of a display portion 50 of a visitor device 22 (i.e. a smartphone) is illustrated. In this example the display portion 50 is touch sensitive and can also function as a user input device. In FIG. 7, the wayfinding system 10 has been configured to display the entire facility map 36 on the display portion, in an overhead view. To provide this view, the virtual camera positioning method 100 can be engaged, with all map objects selected to be shown in the frame, and the virtual camera orientation can be set for an overhead view point (i.e. with the yaw facing the front of the map 36 and the virtual camera pitch in a top down orientation). In this example, the boundaries of the frame 230 being defined by the virtual camera positioning method 100 are shown using dashed lines, but these framing lines 230 are only included herein for illustrative purposes and need not be displayed to the user when the wayfinding system 10 is in use. From this view point, the map 36 may appear as a generally 2D map.

Figure 8:
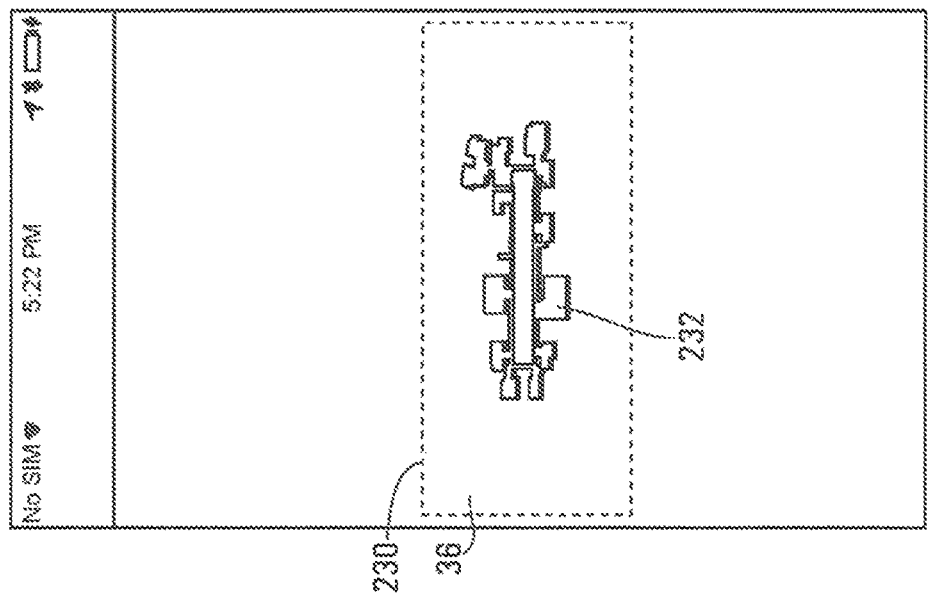
FIG. 8 is a schematic representation of the display of FIG. 7 with the virtual camera in a different orientation.

To provide a different view to the user, the framing system 100 may be used to frame the entire map 36 (i.e. all the objects), but the virtual camera orientation may be set so that the pitch is at about a 45 degree angle, as shown in FIG. 8. This may provide a more visually appealing view of the map 36, and may also alter the size of the frame 230 boundary on the user display 50. Optionally, the wayfinding system 10 may be configured to animate the transition from the state shown in FIG. 7 to the state shown in FIG. 8.

In the illustrated example, the map 36 includes a plurality of objects (e.g. stores of a shopping center in this case) that may be of interest to a user. For example, a user may wish to obtain more information about store object 232, and may tap on the object 232 on the touch display 50. This tap can be registered by the wayfinding system 10 and can trigger the application of the virtual camera positioning method 100.

Figure 9:
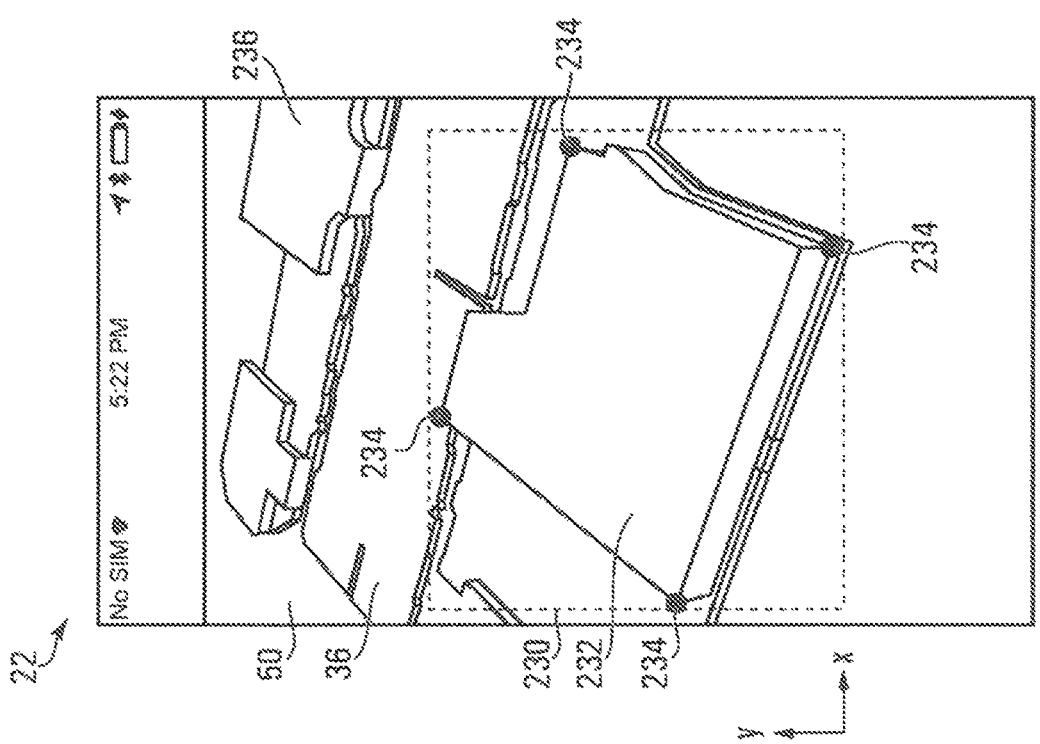
FIG. 9 is a schematic representation of the display of FIG. 7 with the virtual camera positioned to show a target object from the map.

In response to the user tapping the store object 232, the virtual camera positioning method 100 may set store object 232 as the target object, and corresponding object point cloud to be included in a new frame display that is zoomed in on the store object 232 (see line 230 in FIG. 9). To facilitate this change, the virtual camera positioning method 100 can be configured to retrieve pre-determined "store view" camera position and orientation data which may be stored in the server platform 12, and optionally in the object library. Optionally, a variety of pre-determined camera position and orientation values (for pitch and yaw) can be set by a system administrator and can be recalled as needed by the virtual camera positioning method 100. The virtual camera position and orientation values may include absolute values for each target object (i.e. when a user selects object 232, the yaw is 22.5 degrees and the pitch is a 45 degree angle), or relative based on the requested change of state (i.e. when transitioning from the overall mall view 36 to a specific store view, preserve the existing camera pitch in the new frame, but set the yaw to 22.5 degrees), or any combination thereof. Optionally, the wayfinding system 10 can be configured to allow a user to manually manipulate the view they are presented, such that the virtual camera position and orientation determined via the virtual camera positioning method 100 can be subsequently modified by the user.

Alternatively, instead of using pre-set virtual camera position values the framing system 100 may be set to use the current camera pitch and yaw values as the default for the new frame display, and then may allow a user to modify the pitch and yaw values as desired (for example by manually tilting or moving the virtual camera using the touchscreen or the like).

Referring to FIG. 9, in the present example the wayfinding system 10 is configured so that when store object 232 is selected, the virtual camera positioning method 100 maintain the current pitch of the virtual camera for the new camera position, and will set the yaw at 22.5 degrees to provide a desired visual appearance of the store object 232. As seen FIG. 9, the virtual camera is then positioned such that the store object 232 substantially fills one axis of the display 50 (in this case the x-axis, which functions as the constraining axis) and is generally centered along the y-axis of the display 50. Also, it is clear in this example that all of the points in the oriented point cloud (i.e. each of its outer vertices 234 of the store object 232) are visible on the display 50.

Figure 10:
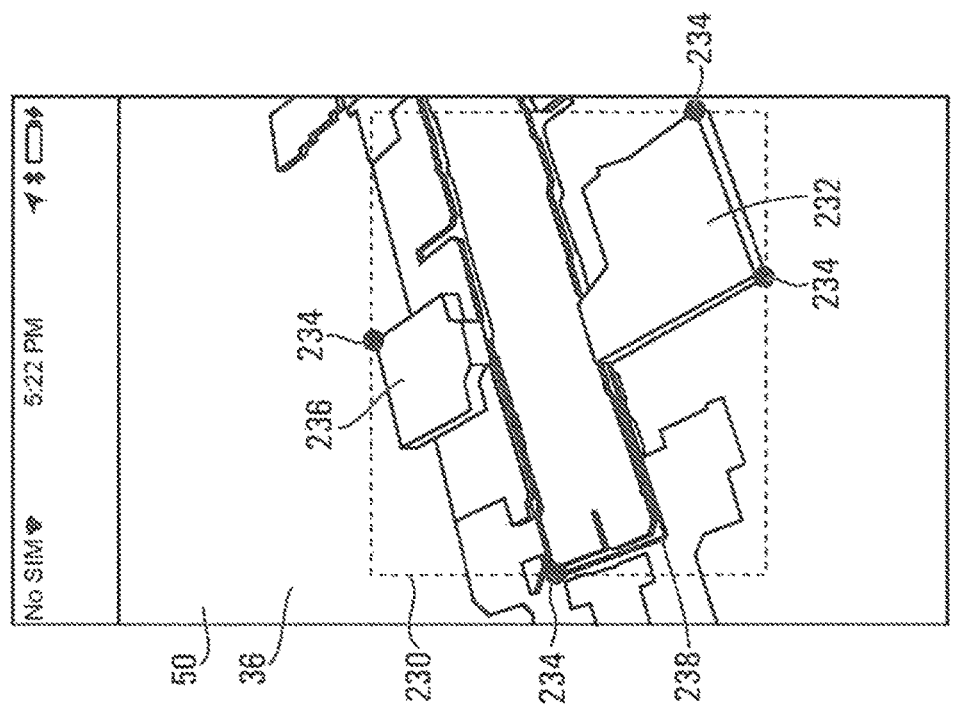
FIG. 10 is a schematic representation of the display of FIG. 7 with the virtual camera positioned to show a target objects from the map.

Referring to FIG. 10, if the user were to select a second object, such as store object 236, the wayfinding system 10 may be operable to calculate and display a path object 238 on the map 36. The virtual camera positioning method 100 may then be engaged to reposition the virtual camera to frame store objects 232 and 236, as well as the path 238 extending between them. To begin the virtual camera positioning method 100, the store objects 232 and 236, and path 238 are identified as the target objects to be displayed, and their associated object point cloud data can be gathered from the object library. The current virtual camera position and orientation data can be provided to the virtual camera positioning method 100, and in this example are set so that the virtual camera yaw is the angle between the exit point of polygon 232 and the entrance point of polygon 236, and the pitch is set to match the current virtual camera pitch.

The virtual camera positioning method 100 can then generate a point cloud collection containing the points of all target store objects 232, 236 and 238, and determine a final virtual camera position and orientation so that the set of target store objects 232, 236 and 238 are all shown within the display 50, and so that the set of target store objects 232, 236 and 238 occupy substantially one entire axis of the display (about 90% of the constraining x-axis as illustrated).

Figure 11:
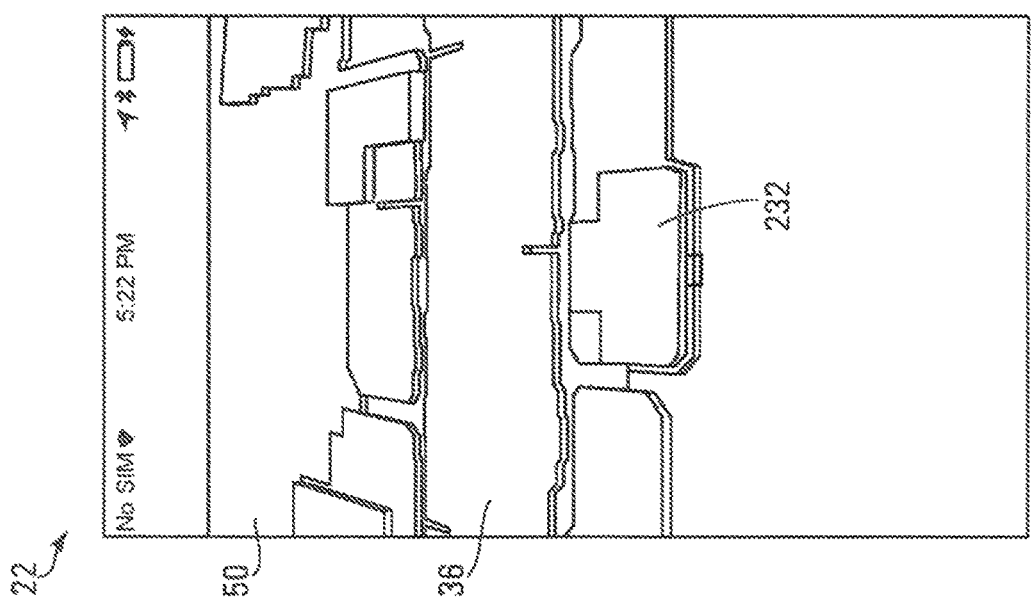
FIG. 11 is a schematic representation of a display of a user device showing another example of a map.

Referring to FIG. 11, another example of a map 36 is shown on the display 50 of a visitor device 22. In this example, the view on the display 50 represents a view in which the user has manually manipulated the virtual camera to a desired location and desired orientation in the map coordinate space. This may be achieved using any suitable mechanism that is compatible with the wayfinding system 10, for example using touch screen controls that allow a user to manipulate the map 36. If the user then taps store object 232 for more information, the wayfinding system 10 can apply the virtual camera positioning method 100, using the object 232 as the target object to be displayed, and utilizing the virtual camera position and orientation details from the touch input controls (possibly importing this data into the wayfinding system 10 if it originated in another system) to provide the current virtual camera pitch and yaw values. The virtual camera positioning method 100 can retrieve a pre-determined set of desired camera pitch and yaw values for the "store view" pre-set, and determine the rotation matrix required to move the virtual camera from its current pitch and yaw state (as gathered from the touch input system) to its desired end state pitch and yaw values.

Figure 12:
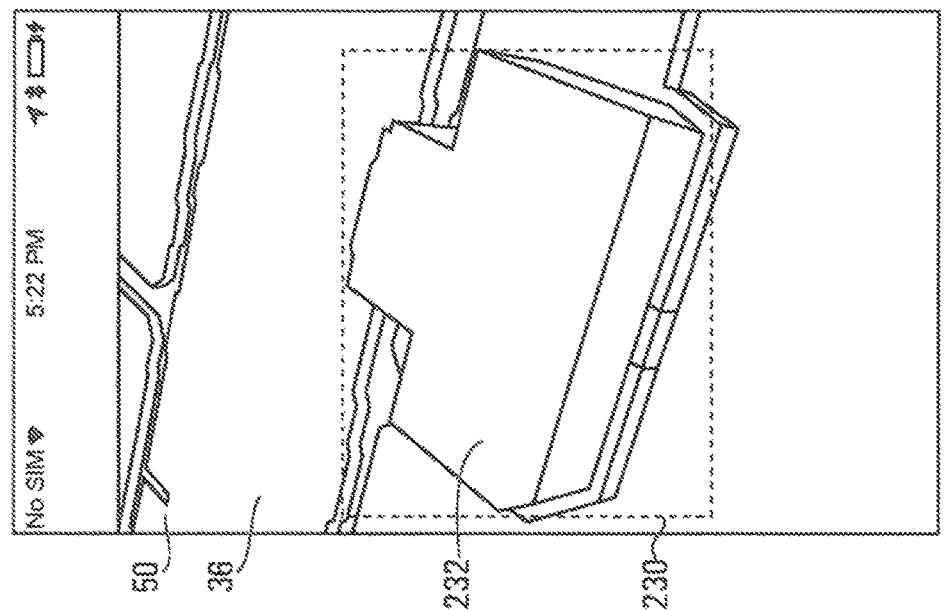
FIG. 12 is a schematic representation of the display of FIG. 11 with the virtual camera positioned to show a target object from the map.

Similar to the view presented in FIG. 9, in the example of FIGS. 11 and 12, the method 100 was executed to retain the same pitch value for the end state, and to add 22.5 degrees to the current yaw value to provide a visually appealing vantage point for the store object 232. The method 100 is also run to define the point cloud collection, create a bounding cube and set the x, y and z position data so that the store object 232 occupies about 90% of the x-axis of the display 50.

Figure 13:
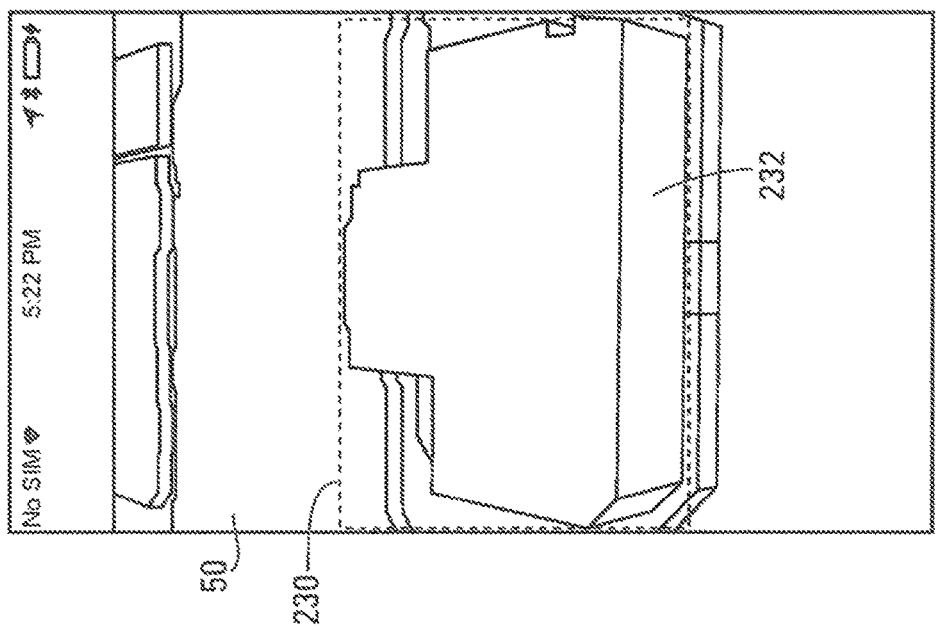
FIG. 13 is a schematic representation of the display of FIG. 12 with the virtual camera in a different position.

Alternatively, the method 100 could be set to maintain both the current pitch and current yaw values for the virtual camera, for example if the virtual camera begins in a user-manipulated position. Under such conditions, executing the method 100 may result in a slight different visual appearance after framing the store object 232, as shown in FIG. 13.

Optionally, the method 100 may be iterated by the wayfinding system 10 in response to user movements or other such inputs. For example, the wayfinding system 10 may get a variety of data from a visitor device 22, including for example, position (GPS, etc.) and direction data (compass heading). The wayfinding system 10 may utilize this data, and any other suitable data, to determine a user's current position relative to a map 36 and to track a user's progress along a calculated path 238. For example, the wayfinding system 10 may define the user's current position as a node object, and may be able to determine the relative position of the user position node, such as node 240 in FIG. 14, relative to other objects, and specifically with reference to the next wayfinding node in the path 238, such as node 242 in FIG. 14. To help provide dynamic, turn-by-turn type wayfinding directions, the wayfinding system 10 may engage the method at a given frequency to update the objects displayed to the user based on the user's current position and progress along the path 238. Which objects are included in the wayfinding systems 10 automatic grouping of objects may be based on a variety of factors, but may include, for example the user's current position node 240, the next wayfinding node 242 and at least the segment of the path 238, see segment 244 extending between nodes 240 and 242. The wayfinding system 10 may also determine that the desired end state camera yaw and pitch values match the current state yaw and pitch values. Alternatively, the wayfinding system 10 may be configured to select the end state camera pitch to match the current camera pitch value, but set the end state camera yaw value based on the user's current heading (based on directional compass data pulled from the user device—if available).

Figure 14:
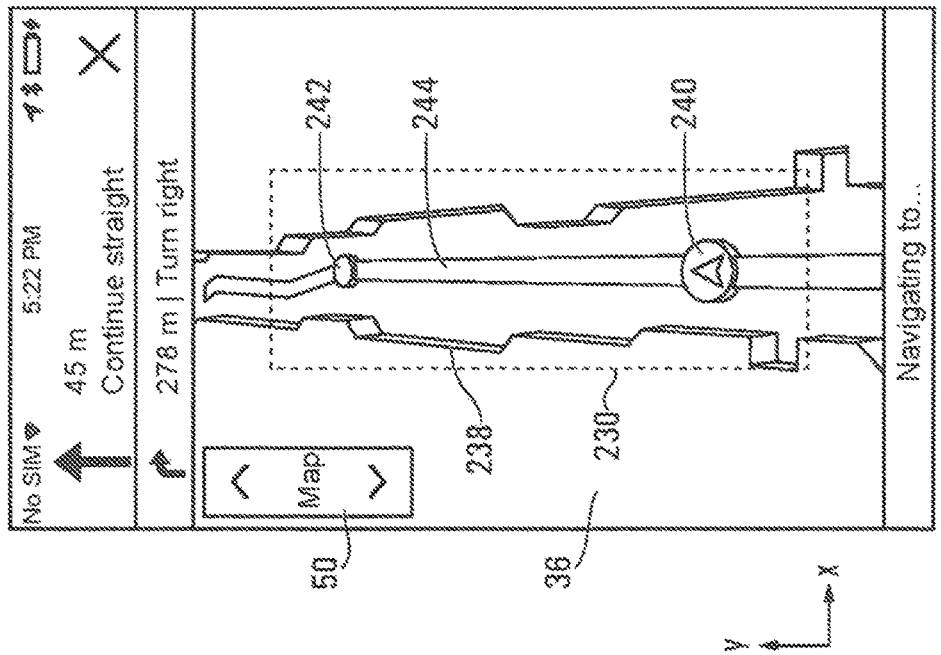
FIG. 14 is a schematic representation of the display of a user device depicting turn-by-turn type directions.

With the current and end state yaw and pitch values set, the method 100 can then be executed to set the point cloud collection, define the rotation matrix, create the bounding cube (or sphere, etc.) and generate the end state x, y, and z values for the virtual camera. As shown in FIG. 14, the method 100 positioned the virtual camera such that the frame 230 is maximized along the y-axis of the display 50.

This may help create a visually appealing effect in which the virtual camera can continuously zoom to the next waypoint or other object in the patch 238 as the user gets closer to it, and then automatically zoom out to show the next waypoint in the distance and the path segment 244 leading the next waypoint, once the user passes a given waypoint.

The frequency at which the method 100 is executed may be a time-based factor (execute the method 100 once per n number of seconds and/or n times per second, etc.), a spatial factor (execute the method each time the user moves 5 meters, 1 foot, etc.) and a combination of these and other factors.

Optionally, the transitions between virtual camera positions/states (i.e. positions at the beginning of the virtual camera positioning method 100 and at the end of the virtual camera positioning method 100 (such as the transition from FIG. 7 to FIG. 8, FIG. 8 to FIG. 9, FIG. 9 to FIG. 10, FIG. 11 to FIG. 12, the progressions along the a path as illustrated in FIG. 14, and the like) can be output to the user display directly and/or displayed with animated transitions between the positions. If an animation or multi-step transition between virtual camera states is desired, the virtual camera positioning method 100 may be iterated several times to help provide multiple intervening virtual camera positions/states between the beginning state and ultimate end state. For example, the virtual camera positioning method 100 may be iterated at the refresh rate of the user display device (e.g. 60 Hz) to provide a unique camera position for each refresh of the user display device.

Optionally, the virtual camera positioning method 100 may be used in other tasks in the wayfinding system 10, beyond the map manipulation and wayfinding requests from the system users. For example, the wayfinding system 10 may include a map editing module that enables a system administrator, system user or any other authorized user to create and/or edit the maps 36, objects to be used in the maps 36 and other aspects of the wayfinding system 10.

Optionally, the map editing module may include a web-based map editing interface and/or may be included in the portal management module 40. As one part of the map editing functions, the wayfinding system 10 can be configured to allow a user to generate one or more static, 2D images of the map 36 under review. One example of a map editing tool that may be used with the virtual camera positioning method 100 is the map editing tool described in U.S. Prov. Patent App. No. 62/470,924, filed Mar. 12, 2017, entitled Systems and Methods for Indoor Mapping and incorporated herein by reference.

In some instances, a user may wish to generate 2D images that represent and entire 3D map 36, or a portion thereof. For example, a user may wish to generate such 2D images (also referred to as "perspectives" or "renders") to generate static map images (such as for printing or hosting on the web and the like) or to create rasterized 2D images or tilesets for use in classic "tile-based" 2D map viewers (such as MapBox®, Leaflet, or Google Maps™ (2D version and the like). Sometime a user and/or system may decide to switch to a 2D map viewer because the hardware running the wayfinding system is not capable of rendering the maps in 3D and/or not capable of rendering them with a desired level of performance, or for example, if system operator is using a 3rd party software to render the maps that works with 2D renders.

In some existing systems, to create a desired 2D image a user may be required manipulate the map so that the portion of the map shown in the user display represents the image that the user wishes to create. This is done in some existing systems by using a user input device (such as a mouse) to manually manipulate the map 36 and/or by requiring a user to directly input camera position and orientation values to create a desired view of the 3D map. When the user is satisfied with the view provided to them on the user display the system can rasterize the view to a static image. Existing tools of this type can, in some instances, be tricky to use and can require a relatively high degree of user skill and/or training.

Figure 15:
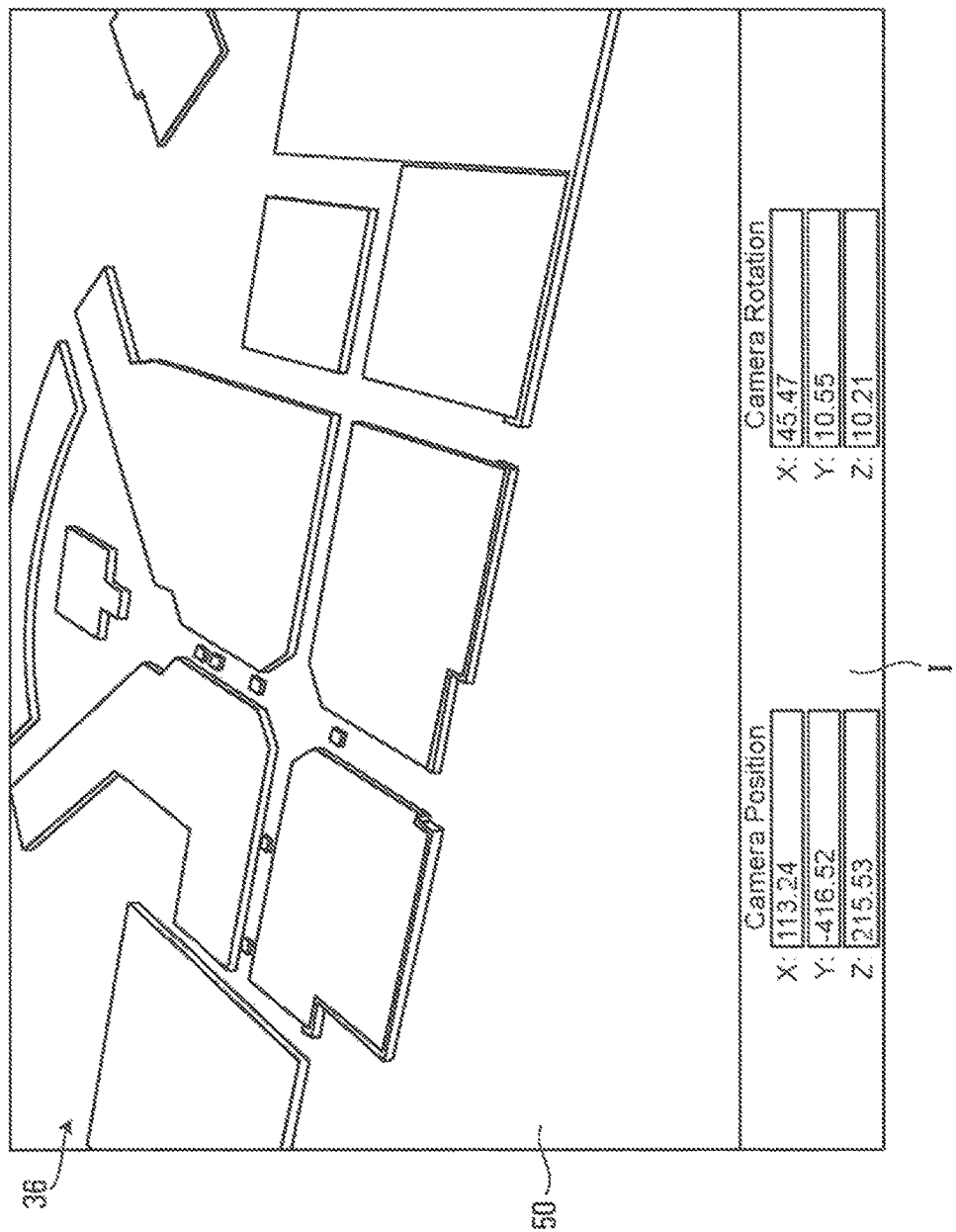
FIG. 15 is a schematic representation of a display of a user device showing another example of a map.
Figure 16:
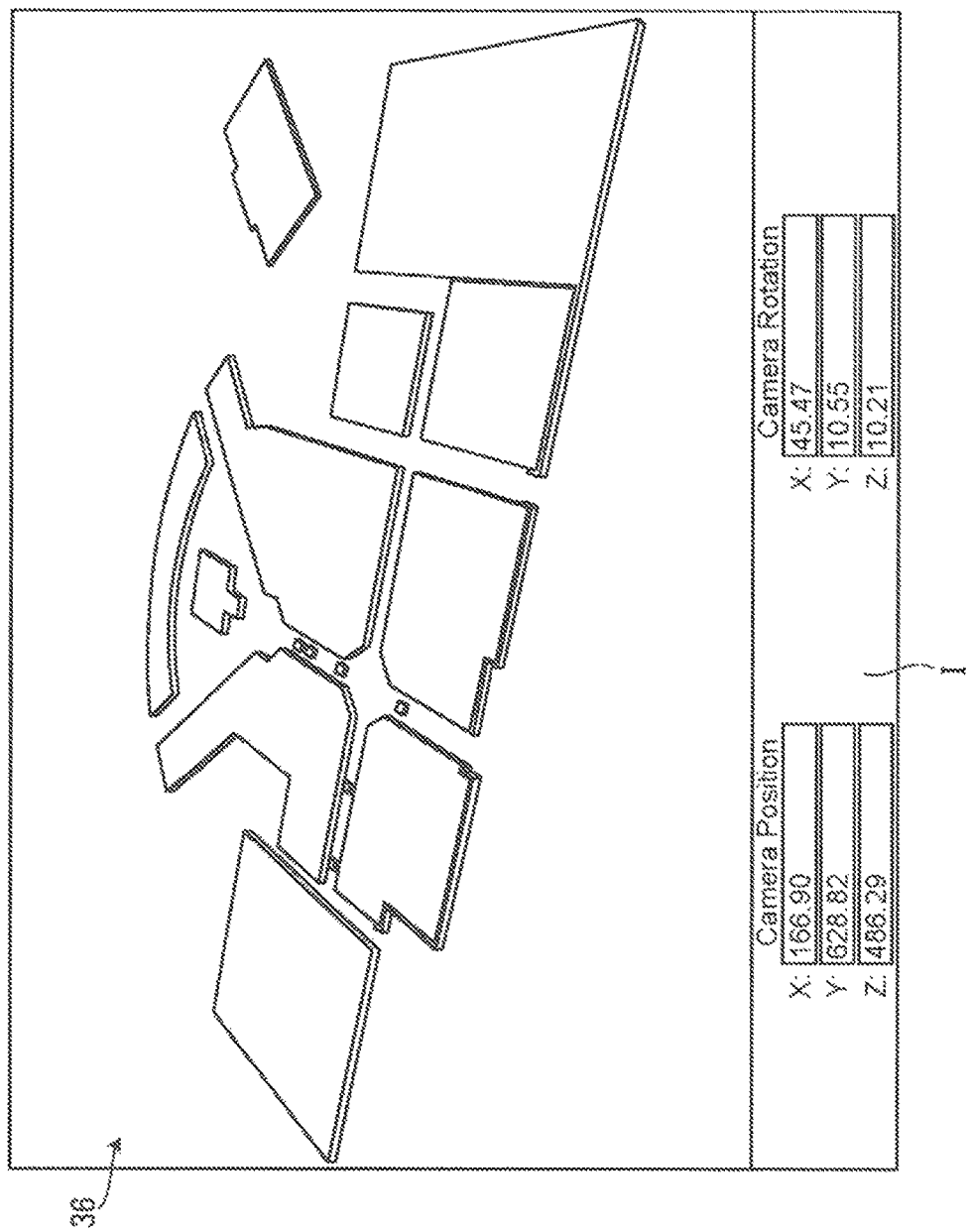
FIG. 16 is a schematic representation of the display of FIG. 15 with the virtual camera in a different position.

A schematic representation of one such system is shown in FIGS. 15 and 16. In this example, the system includes a manual input module "I" which is configured to permit a user to manually input a desired camera position (x, y, z space) and rotation value (x, y, z values) in respective fields. The system can then apply these values and position the virtual camera accordingly to display the map 36 on the display portion 50. As can be appreciated, manually inputting x, y, z, position information in the map coordinate system may not be intuitive to all system users, and as such an initial framing of the map 36 (FIG. 15) may not reflect the user's intentions. The user may then manually change some of the position information (as shown in this example, and optionally may change the virtual camera rotation information as well), and perhaps iterate the attempts, until they arrive at a desired framing position (FIG. 16). This may be relatively time consuming and prone to error, which may cause the user to be become frustrated.

As an alternative to such existing methods, the wayfinding system 10 may be configured to use the virtual camera positioning method 100 to help generate selected 2D images based on a 3D map 36. For example, a tool editor of the wayfinding system 10 may display the 3D map 36 to the user on the user display (as discussed herein). The system may then allow a user to select the object(s) that she wishes to include in the desired, 2D image. This may be accomplished by the user selecting one or more objects as described herein (such as by tapping the objects on the display screen) and/or by having the user select the objects from a list of pre-set/ pre-selected objects or combination of objects. Such a list may be provided to a user using any suitable mechanism, including a pull-down list, collection of icons, a text-based list and the like.

Optionally, the system 10 may include preset "views" that a user may choose to create the 2D view, such as, for example, a perspective view, a top plan view, a side elevation view, an "entire map" view, a "store" view, an "All buildings" grouping that includes all building objects, but excludes other regions such as parking lots, parks, walkways and the like. The pre-set object selections can also include a pull-down list of each store or building type object in the map 36 so that a user may select one or more objects for display. Other types of pre-set object selections can be created by system administrators and/or by system users. Optionally, each pre-set view type can be associated with a given virtual camera pitch and yaw value.

Having selected the objects to be included in the perspective, the user can then provide a desired yaw and pitch for the virtual camera. Optionally, the system 10 can be configured so that the yaw and pitch values for the virtual camera are generally aligned with real-world features, such as compass points and elevation. For example, the system 10 yaw values may be configured such that 0 degrees relates to north, 90 degrees relates to east, 180 and −180 both relate to south, and −90 relates to west. The user may then use these references to help select the yaw value desired for the 2D perspective (for example, the user may wish to view the map from the West, and may then input a yaw value of −90 degrees). Similarly, the pitch values may be calibrated so that 90 degrees produces a top-down, plan view and 0 degrees is substantially parallel to the "floor" of the map 36. A user wanting to create a desired view can use this scale to select a desired camera pitch, such as a pitch of 45 degrees to provide a partial overhead perspective view. Configuring the system in this manner may help it seem intuitive for a system user when creating a desired view. For example, if the user wishes to change the view so that it is from a "slightly higher" vantage point, the user may simply increase the pitch value, which may seem more intuitive than having to generate new camera rotation information in x, y, x, coordinate values.

Optionally, instead of the user manually inputting desired pitch and yaw values, the system 10 may allow the user to manually manipulate the 3D map to create a desired view point, and then capture the instantaneous pitch and yaw values when the map editing module is engaged and/or when the objects are selected.

Figure 17:
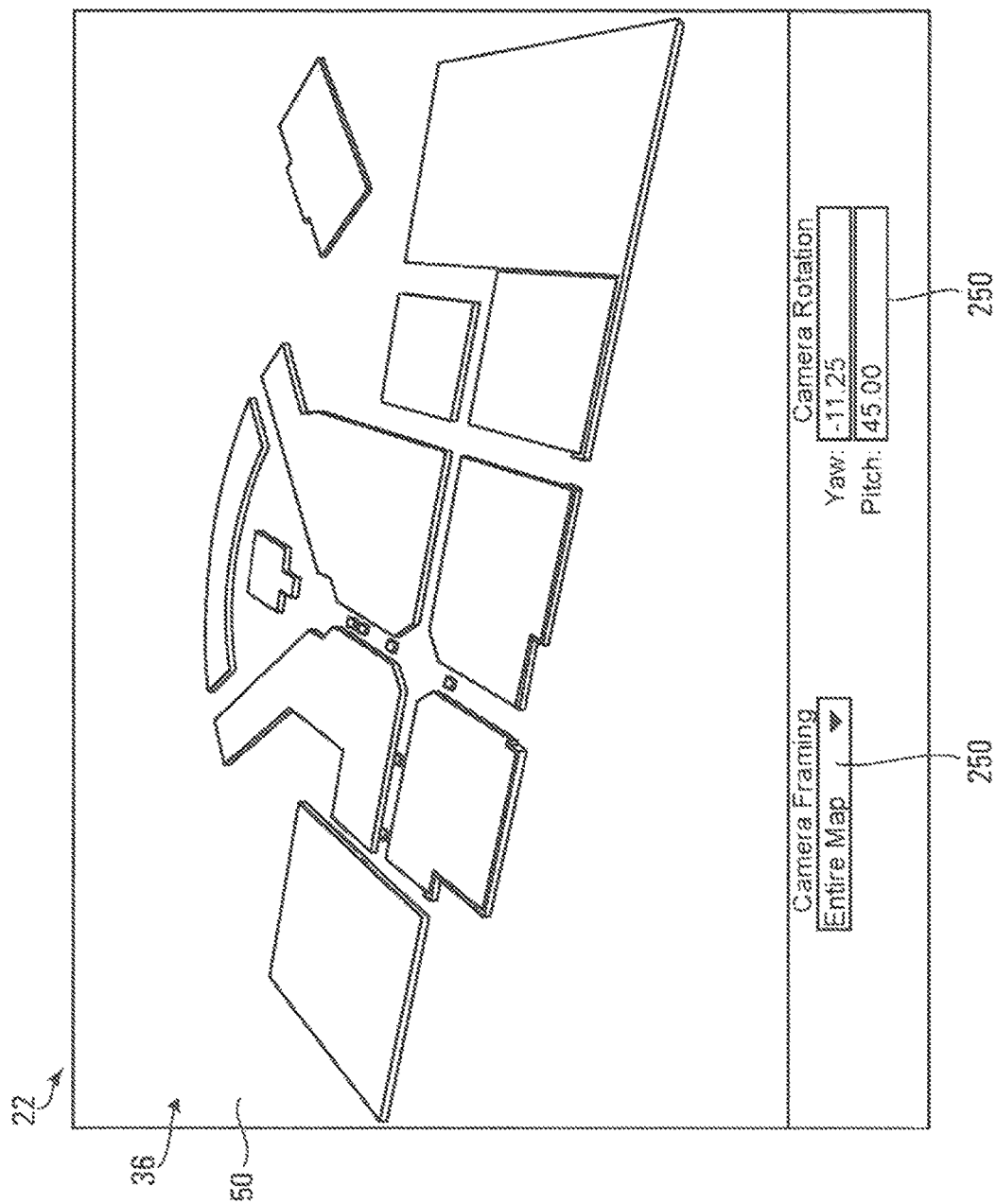
FIG. 17 is a schematic representation of another example of a display of a user device.

A schematic representation of one such example of a user display 50 for use in the wayfinding system 10 is illustrated in FIG. 17, in which the individual, x, y, z coordinate fields on the input module "I" of FIGS. 15 and 16 has been replaced with a pre-set view selection field in the form of a camera framing pull down menu 250, and a camera rotation input field 252, which in this example includes fields for yaw and pitch inputs.

Having received the selection of objects to be displayed (i.e., target objects) and desired camera yaw and pitch values, the system 10 may then utilize the method 100 to position the virtual camera so that the set of target objects are displayed in the frame. For example, receiving a selection of objects from the user in as noted in this example may provide the inputs for step 102 of the method 100 described herein, and the pitch and yaw values could provide the inputs for step 104 (FIG. 3).

Alternatively, to obtain the end state pitch and yaw values the method 100 may pull in the pre-set pitch and yaw values for the view type selected by the user (if any), or alternatively may maintain one or both of the initial pitch and yaw values (as currently used to present the overall map 36 to the user) as described herein. A point cloud collection can be then defined, and a rotation matrix can be calculated. The rotation matrix can be applied to create the oriented point cloud and a suitable bounding shape can be created. The method 100 can then output the virtual camera position and orientation data and the virtual camera can be moved to the indicated location. The user display can then be updated to show the elected objects from the desired perspective, and the display can then be rasterized and a static 2D image created.

While the above description provides examples of one or more apparatus, methods, or systems, it will be appreciated that other apparatus, methods, or systems may be within the scope of the claims as interpreted by one of skill in the art.

The invention claimed is:

1. A method for positioning and orienting a virtual camera relative to an electronic map, the method comprising:
   determining a set of target objects within the electronic map based on user selections received from a user device, the set comprising at least one target object, each target object having at least one point;
   determining a desired orientation of the virtual camera;
   generating a point cloud collection containing each point of the set of target objects;
   generating a rotation matrix by comparing a current orientation of the virtual camera and the desired orientation of the virtual camera;
   generating an oriented point cloud by applying the rotation matrix to each point of the point cloud collection;
   generating a three-dimensional bounding shape containing each point of the oriented point cloud;
   calculating a desired position and orientation for the virtual camera based on a field of view of the virtual camera and the three-dimensional bounding shape; and
   providing the electronic map to the user device for display, the electronic map comprising a view from the virtual camera at the desired position and orientation;
   wherein the field of view of the virtual camera comprising a total width along an x-axis and a total height along a y-axis;

the desired position and orientation comprising an x-coordinate value along the x-axis, a y-coordinate value along the y-axis, and a z-coordinate value along a z-axis; and calculating the desired position and orientation for the virtual camera based on the field of view of the virtual camera and the three-dimensional bounding shape comprises:

determining a gross width and a relative width of the oriented point cloud, the gross width comprising a greatest distance between any two points of the oriented point cloud along the x-axis, the relative width comprising the gross width of the oriented point cloud as a proportion of the total width of the field of view of the virtual camera;

determining a gross height and a relative height of the oriented point cloud, the gross height comprising a greatest distance between any two points of the oriented point cloud along the y-axis, the relative height comprising the gross height of the oriented point cloud as a proportion of the total height of the field of view of the virtual camera;

if the relative width of the oriented point cloud is greater than the relative height of the oriented point cloud, identifying the x-axis as a constraining axis and the y-axis as a non-constraining axis;

if the relative width of the oriented point cloud is not greater than the relative height of the oriented point cloud, identifying the y-axis as the constraining axis and the x-axis as the non-constraining axis; and determining the z-coordinate value based on the constraining axis.

2. The method of claim 1, wherein:

the set of target objects comprise a destination object identified by the user selections; and determining a set of target objects based on user selections received from a user input device comprises:

determining an origination object;

determining at least one path from the origination object to the destination object; and including the at least one path and the origination object as being in the set of target objects.

3. The method of claim 2, wherein the origination object is determined based on global positioning system data generated by the user input device.

4. The method of claim 1, wherein the three-dimensional bounding shape comprises at least one of a group consisting of a sphere, a cone, a cylinder, a polyhedron, a cube, a prism, and a pyramid.

5. The method of claim 1, wherein the desired orientation of the virtual camera comprises a desired yaw angle and a desired pitch angle.

6. The method of claim 5, wherein:

the current orientation of the virtual camera comprises a current pitch angle; and determining the desired orientation of the virtual camera comprises using the current pitch angle as the desired pitch angle.

7. The method of claim 5, wherein the desired yaw angle is determined based on an angle between a first point and a second point of the set.

8. The method of claim 7, wherein the first point comprises an exit point of an origination object and the second point comprises an entry point of a destination object.

9. The method of claim 1, wherein determining the z-coordinate value comprises determining the z-coordinate value when the constraining axis is scaled to substantially occupy the field of view.

10. The method of claim 9, wherein substantially occupying the field of view comprises occupying at least about 70% of the field of view.

11. The method of claim 10, wherein calculating the desired position and orientation for the virtual camera based on the field of view of the virtual camera and the three-dimensional bounding shape further comprises determining the x-coordinate value as being a point along the x-axis that is equidistant from the two points of the oriented point cloud defining the gross width.

12. The method of claim 1, wherein calculating the desired position and orientation for the virtual camera based on the field of view of the virtual camera and the three-dimensional bounding shape further comprises determining the y-coordinate value as being a point along the y-axis that is equidistant from the two points of the oriented point cloud defining the gross height.

13. A system for positioning and orienting a virtual camera relative to an electronic map, the system comprising:

a communication network;

a wayfinding server comprising:

a wayfinding storage unit for storing electronic maps; and a wayfinding processor operatively coupled to the wayfinding storage unit and configured for providing an electronic map to one or more user devices via the communication network; and the one or more user devices, wherein each user device comprises a user processor operatively coupled to a user memory and configured for:

receiving the electronic map from the wayfinding server via the communication network;

determining a set of target objects within the electronic map based on user selections received by the user device, the set comprising at least one target object, each target object having at least one point;

determining a desired orientation of the virtual camera;

generating a point cloud collection containing each point of the set of target objects;

generating a rotation matrix by comparing a current orientation of the virtual camera and the desired orientation of the virtual camera;

generating an oriented point cloud by applying the rotation matrix to each point of the point cloud collection;

generating a three-dimensional bounding shape containing each point of the oriented point cloud;

calculating a desired position and orientation for the virtual camera based on a field of view of the virtual camera and the three-dimensional bounding shape; and providing the electronic map for display, the electronic map comprising a view from the virtual camera at the desired position and orientation;

wherein the field of view of the virtual camera comprising a total width along an x-axis and a total height along a y-axis;

the desired position and orientation comprising an x-coordinate value along the x-axis, a y-coordinate value along the y-axis, and a z-coordinate value along a z-axis; and calculating the desired position and orientation for the virtual camera based on the field of view of the virtual camera and the three-dimensional bounding shape comprises:
- determining a gross width and a relative width of the oriented point cloud, the gross width comprising a greatest distance between any two points of the oriented point cloud along the x-axis, the relative width comprising the gross width of the oriented point cloud as a proportion of the total width of the field of view of the virtual camera;
- determining a gross height and a relative height of the oriented point cloud, the gross height comprising a greatest distance between any two points of the oriented point cloud along the y-axis, the relative height comprising the gross height of the oriented point cloud as a proportion of the total height of the field of view of the virtual camera;
- if the relative width of the oriented point cloud is greater than the relative height of the oriented point cloud, identifying the x-axis as a constraining axis and the y-axis as a non-constraining axis;
- if the relative width of the oriented point cloud is not greater than the relative height of the oriented point cloud, identifying the y-axis as the constraining axis and the x-axis as the non-constraining axis; and
- determining the z-coordinate value based on the constraining axis.

14. The system of claim 13, wherein:
the set of target objects comprise a destination object identified by the user selections; and
determining a set of target objects based on user selections received from a user input device comprises:
- determining an origination object;
- determining at least one path from the origination object to the destination object; and
- including the at least one path and the origination object as being in the set of target objects.

15. The system of claim 13, wherein the desired orientation of the virtual camera comprises a desired yaw angle and a desired pitch angle.

16. The system of claim 15, wherein:
the current orientation of the virtual camera comprises a current pitch angle; and
determining the desired orientation of the virtual camera comprises using the current pitch angle as the desired pitch angle.

17. The system of claim 15, wherein the desired yaw angle is determined based on an angle between a first point and a second point of the set.

18. The system of claim 17, wherein the first point comprises an exit point of an origination object and the second point comprises an entry point of a destination object.

* * * * *